United States Patent
Steiner et al.

(10) Patent No.: US 9,396,914 B2
(45) Date of Patent: Jul. 19, 2016

(54) OPTICAL DETECTORS AND METHODS OF USING THEM

(71) Applicants: Urs Steiner, Branford, CT (US); Daniel Robert Marshak, Weston, MA (US)

(72) Inventors: Urs Steiner, Branford, CT (US); Daniel Robert Marshak, Weston, MA (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 224 days.

(21) Appl. No.: 14/082,685

(22) Filed: Nov. 18, 2013

(65) Prior Publication Data

US 2014/0151529 A1 Jun. 5, 2014

Related U.S. Application Data

(60) Provisional application No. 61/728,188, filed on Nov. 19, 2012, provisional application No. 61/732,865, filed on Dec. 3, 2012, provisional application No. 61/781,945, filed on Mar. 14, 2013.

(51) Int. Cl.
*G01J 1/44* (2006.01)
*H01J 43/20* (2006.01)

(52) U.S. Cl.
CPC ..................................... *H01J 43/20* (2013.01)

(58) Field of Classification Search
CPC ........... H01J 43/04; H01J 43/48; H01J 43/30; H01J 49/0009; H01J 49/0027; H01J 49/0095; H01J 49/00; H01J 49/02; H01J 49/025; H01J 49/08; H01J 49/14; H01J 49/26; H01J 49/28; H01J 27/20; H01J 37/08; H01J 43/20
See application file for complete search history.

(56) References Cited

U.S. PATENT DOCUMENTS

| | | | | |
|---|---|---|---|---|
| 3,003,065 A | * | 10/1961 | Ketchledge | H01J 43/30 250/207 |
| 3,310,678 A | | 3/1967 | Kylander | |
| 3,543,095 A | | 11/1970 | Ensminger | |
| 3,614,646 A | * | 10/1971 | Hansen | H03G 3/3084 250/207 |
| 3,765,776 A | | 10/1973 | Bravenec | |
| 5,367,222 A | * | 11/1994 | Binkley | H01J 43/30 313/533 |
| 5,995,989 A | | 11/1999 | Gedcke | |
| 6,841,936 B2 | * | 1/2005 | Keller | H01J 43/30 250/207 |
| 7,005,625 B1 | | 2/2006 | Mitchell | |
| 7,030,355 B1 | | 4/2006 | Bochenski | |
| 7,047,144 B2 | * | 5/2006 | Steiner | H01J 49/0027 702/107 |
| 7,291,845 B2 | * | 11/2007 | Moeller | H01J 49/14 250/423 R |
| 7,459,662 B1 | * | 12/2008 | Gardner | H01J 43/30 250/207 |
| 7,479,623 B2 | * | 1/2009 | Gardner | H01J 43/30 250/207 |
| 7,745,781 B2 | | 6/2010 | Steiner | |
| 7,855,361 B2 | | 12/2010 | Steiner | |
| 7,928,361 B1 | * | 4/2011 | Whitehouse | H01J 49/401 250/281 |
| 8,618,457 B2 | * | 12/2013 | Wright | H01J 43/30 250/207 |

(Continued)

OTHER PUBLICATIONS

IPRP for PCT/US2013/070502. (Apr. 25, 2014).

(Continued)

*Primary Examiner* — John Lee
(74) *Attorney, Agent, or Firm* — Rhodes IP PLC; Christopher R Rhodes

(57) ABSTRACT

Certain embodiments described herein are directed to optical detector and optical systems. In some examples, the optical detector can include a plurality of dynodes, in which one or more of the dynodes are coupled to an electrometer. In other configurations, each dynode can be coupled to a respective electrometer. Methods using the optical detectors are also described.

19 Claims, 24 Drawing Sheets

(56) References Cited

U.S. PATENT DOCUMENTS

| | | |
|---|---|---|
| 9,269,552 B2 | 2/2016 | Steiner |
| 2002/0070330 A1 | 6/2002 | Staton |
| 2004/0016867 A1 | 1/2004 | Milshtein |
| 2004/0094730 A1 | 5/2004 | Imai |
| 2004/0232315 A1* | 11/2004 | Streun .................. G01T 1/208 250/214 VT |
| 2004/0232835 A1* | 11/2004 | Keller .................... H01J 43/30 313/533 |
| 2006/0043259 A1 | 3/2006 | Thompson |
| 2006/0080045 A1* | 4/2006 | Steiner ............... H01J 49/0027 702/23 |
| 2006/0230134 A1 | 10/2006 | Qian |
| 2006/0237641 A1* | 10/2006 | Moeller .................. H01J 49/14 250/288 |
| 2007/0108973 A1 | 5/2007 | Lanning |
| 2008/0112106 A1* | 5/2008 | Gardner .................. H01J 43/30 361/225 |
| 2009/0096505 A1 | 4/2009 | Wolters |
| 2009/0230285 A1 | 9/2009 | Wright |
| 2009/0294654 A1* | 12/2009 | Steiner .................. H01J 49/025 250/283 |
| 2010/0288933 A1 | 11/2010 | Duraj |
| 2011/0095177 A1* | 4/2011 | Giannakopulos ..... H01J 49/025 250/282 |
| 2011/0240857 A1* | 10/2011 | Kovtoun ................ H01J 43/30 250/336.1 |
| 2012/0032072 A1 | 2/2012 | Quarmby |
| 2012/0175514 A1 | 7/2012 | Izumi |
| 2012/0205534 A1 | 8/2012 | Hunter |
| 2014/0151529 A1* | 6/2014 | Steiner .................... H01J 43/20 250/207 |
| 2014/0151549 A1* | 6/2014 | Steiner .................... H01J 43/30 250/288 |
| 2014/0239177 A1* | 8/2014 | Kovtoun ................ H01J 40/14 250/336.1 |
| 2015/0162174 A1* | 6/2015 | Badiei ................. H01J 49/0009 250/288 |

OTHER PUBLICATIONS

IPRP for PCT/US2013/070526. (Jun. 5, 2014).

* cited by examiner

OPTICAL DETECTORS AND METHODS OF USING THEM

PRIORITY APPLICATIONS

This application claims priority to each of U.S. Patent Application No. 61/728,188 filed on Nov. 19, 2012, to U.S. Patent Application No. 61/732,865 filed on Dec. 3, 2012 and to U.S. Patent Application No. 61/781,945 filed on Mar. 14, 2013, the entire disclosure of each of which is hereby incorporated herein by reference for all purposes.

TECHNOLOGICAL FIELD

Certain features, aspects and embodiments are directed to optical detectors and methods of using them. In some instances, the optical detector can be configured to amplify a light signal using a plurality of dynodes.

BACKGROUND

Light emission from species is often detected using a photomultiplier tube. The photomultiplier tube is designed to amplify the light signal to permit detection of the light.

SUMMARY

Certain aspects described herein are directed to detectors that can receive photons, measure signals from analog dynode stages and can shunt or shut down dynodes downstream of a saturated dynode to protect the dynodes of the detector. In some configurations, the detector is configured to function without any pulse counting, e.g., comprises only analog stages and no pulse counting stage or pulse counting electrode, and may measure a plurality of analog signals, scale each signal and average the signals. By measuring the input or output current to multiple dynodes, and shutting down high current dynodes, the dynamic range of the detector can be extended and linearity can be improved.

In a first aspect, an optical system configured to receive photons, the optical system comprising a photocathode, an anode and a plurality of dynodes, between the photocathode and the anode is provided. In some embodiments, each dynode is configured to amplify a signal from the photons received by the photocathode. In certain instances, each of the plurality of dynodes is electrically coupled to a respective electrometer.

In certain embodiments, the system can further comprise a first processor electrically coupled to each electrometer. In some embodiments, the first processor is configured to measure the input or output current into each respective dynode. In certain examples, the first processor is configured to calculate a mean input current using received input current signals and using the gain of the respective dynode. In other examples, the first processor is configured to calculate a gain between consecutive dynodes by comparing a current, e.g., input or output current, of the first dynode to a current, e.g., input or output current, of a dynode immediately upstream of the first dynode. In some embodiments, each electrometer is electrically coupled to a signal converter, e.g., an analog-to-digital converter or an ion pulse counter or other suitable signal converters. In some embodiments, a respective power converter can be electrically coupled to each electrometer and analog-to-digital converter pair. In some instances, the first processor is configured to measure all dynode currents simultaneously. In other embodiments, the first processor (or the detector) is configured to prevent a current overload at each dynode. In additional examples, the first processor (or detector or both) is configured to alter the voltage at a saturated dynode (relative to a previous, upstream dynode) to reduce its electron gain to the previous dynode and/or reduce the ion current for all downstream dynodes. In further examples, the processor (or detector or both) is configured to invert the polarity of the voltage to the previous dynode or a subsequent dynode or both. In other examples, the processor (or detector or both) is configured to prevent any substantial secondary electron emission to a downstream dynode adjacent to the dynode where the saturation current is detected. In some embodiments, voltage of the optical detector is not adjusted between measurements. In additional embodiments, the gain of the optical detector is constant. In some examples, gain of the optical detector is not user adjustable. In other embodiments, the optical detector is configured to provide independent voltage control at each dynode of the plurality of dynodes. In some examples, dynode to dynode voltage is regulated to keep the voltage substantially constant (or constant) while allowing the input or output currents to vary at each dynode. In further examples, dynamic range of the current measurements is greater than $10^{10}$ when measuring the current at a rate of 100 kHz. In other examples, the signal from every electrometer is used by the processor to calculate a mean input current. In some embodiments, the processor is configured to calculate the mean input current by calculating the input currents of the dynode signals which are above a minimum noise threshold, e.g., above a noise current signal, and below a maximum saturation threshold, e.g., below a saturation current signal. In additional embodiments, the processor is configured to scale each non-discarded calculated input currents using a respective gain and average the scaled input currents to provide the mean input current. In further embodiments, the system can include at least one optical element optically coupled to the photocathode. In some instances, an entry slit width of the optical detector (and if desired the exit slit width) remains constant when measuring samples having different concentrations. In other embodiments, entry slit width (and if desired the exit slit width) of the optical detector is not adjustable.

In another aspect, an optical system configured to receive an optical emission from a sample, the optical system comprising a photocathode, an anode and a plurality of dynodes between the photocathode and the anode is provided. In some configurations, the system comprises multiple sections of continuous dynodes, e.g., where each section comprises a plurality of dynodes. In some arrangements, at least one section of the plurality of dynodes is electrically coupled to an electrometer.

In certain embodiments, the system further comprises at least one additional electrometer electrically coupled to one of the plurality of dynodes. In some embodiments, the system further comprises a first processor electrically coupled to each electrometer and configured to measure the input or output current into each respective dynode. In other embodiments, at least one dynode without a respective electrometer is positioned between dynodes that are electrically coupled to an electrometer. In further embodiments, one or more sections comprise a plurality of electrometers, in which every other dynode is electrically coupled to an electrometer. In some examples, one or more sections comprise a plurality of electrometers, in which every third dynode is electrically coupled to an electrometer. In other examples, the system can comprise a plurality of electrometers, in which every fourth dynode is electrically coupled to an electrometer. In yet other instances, one or more sections can comprise a plurality of electrometers, in which every fifth dynode is electrically coupled to an electrometer. In further embodiments, each electrometer can be electrically coupled to a signal converter. In some examples, each electrometer is electrically coupled to an analog-to-digital converter, an ion pulse counter or other suitable converters to provide, for example, simultaneous digital signals to the processor from each of the dynodes electrically coupled to an electrometer. In some embodiments, the processor is configured to provide a mean digital signal representative of the concentration of the sample using the simultaneous digital signals. In other embodiments, the system can include a processor electrically coupled to the plurality of dynodes and configured to prevent a current overload at one or more dynodes or at each dynode, e.g., each dynode can be electrically isolated from other dynodes to provide separate signals to the processor. In some instances, the first processor (or detector or both) is configured to alter the voltage at a saturated dynode (relative to a previous dynode) to reduce its electron gain to the previous dynode and reduce the ion current for other downstream dynodes. In other examples, voltage of the optical detector is not adjusted between measuring optical emissions from samples having different concentrations. In further examples, the gain of the optical detector is constant. In some embodiments, gain of the optical detector is not user adjustable. In other embodiments, the processor is configured to provide independent voltage control at each dynode of the plurality of dynodes. In some embodiments, dynode to dynode voltage is regulated to keep the voltage substantially constant (or constant). In other embodiments, dynamic range of current measurement is greater than $10^{10}$ when measuring the ion current at a rate of 100 kHz. In some embodiments, the signal from every electrometer is used by the processor to calculate a mean electron multiplier input current. In certain embodiments, the processor is configured to calculate a mean input current by calculating the input currents of dynode signals which are above a minimum noise threshold, e.g., above noise current signal, and below a maximum threshold, e.g., below a saturation current signal. In some embodiments, the processor is configured to scale each non-discarded calculated input current using a respective dynode gain and average the scaled input currents to provide a mean input current. In certain examples, the system can include at least one optical element optically coupled to the photocathode. In other examples, an entry slit width of the optical detector (and/or the exit slit width) remains constant when measuring samples having different concentrations. In some embodiments, entry slit width of the optical detector (and/or exit slit width) is not adjustable.

In an additional aspect, an optical detector comprising a photocathode, an anode and a plurality of dynodes, between the photocathode and the anode, in which each of the plurality of dynodes is configured to electrically couple to a respective electrometer is provided.

In certain embodiments, the plurality of dynodes and the electrometers are in the same housing. In some embodiments, each electrometer is electrically coupled to a respective signal converter. In other embodiments, each of the respective signal converters is an analog-to-digital converter, an ion pulse counter or other signal converters. In some embodiments, each of the signal converters is configured to provide a signal to a processor in an electrically isolated manner. In other examples, the detector comprises a respective power converter electrically coupled to each electrometer and analog-to-digital converter pair. In some configurations, for one or more dynodes, e.g., each dynode, the electrometer and the converted can be at substantially the same electrical potential, e.g., where the processor is at ground potential. In some examples, the detector comprises a processor electrically coupled to each of the plurality of dynodes and configured to prevent a current overload at each dynode. In certain embodiments, the processor is configured to alter the voltage at, upstream or downstream of a dynode where a saturation current is detected. In some embodiments, the processor is configured to invert the polarity of a voltage at, upstream or downstream of the dynode where the saturation current is detected. In other embodiments, the processor is configured to prevent any substantial secondary electron emission to a downstream dynode adjacent to the dynode where a saturation current is detected.

In another aspect, an optical detector comprising a photocathode, an anode and a plurality of dynodes, between the photocathode and the anode, in which each of the plurality of dynodes is electrically coupled to a respective electrometer configured to provide an output signal is provided.

In certain embodiments, the plurality of dynodes and the electrometers are in the same housing. In other embodiments, each electrometer is electrically coupled to a respective signal converter. In additional embodiments, each of the respective signal converters is an analog-to-digital converter, an ion pulse counter or other suitable signal converters. In further embodiments, each of the analog-to-digital converters is configured to electrically couple to a processor in an electrically isolated manner. In some examples, the optical detector comprises a respective power converter electrically coupled to each electrometer and analog-to-digital converter pair. In other embodiments, the detector comprises a processor electrically coupled to each of the plurality of dynodes and configured to prevent a current overload at each dynode, e.g., each dynode can be electrically isolated from other dynodes to provide a signal to the processor. In some embodiments, the processor is configured to alter the voltage at, upstream or downstream of a dynode where a saturation current is detected. In some instances, the processor is configured to invert the polarity of a voltage at, upstream or downstream of the dynode where the saturation current is detected. In other embodiments, the processor is configured to prevent any substantial secondary electron emission to a downstream dynode adjacent to the dynode where a saturation current is detected.

In an additional aspect, an optical detector comprising a signal amplification device constructed and arranged to receive photons emitted by a sample and to amplify a signal representative of the received photons by secondary ejection of electrons from surfaces, in which the surfaces that are effective to eject electrons to amplify the signal are each configured to electrically couple to an electrometer is described.

In certain examples, at least two adjacent surfaces effective to eject electrons are configured to electrically couple to a respective electrometer. In other examples, every other surface effective to eject electrons is configured to electrically couple to a respective electrometer. In some embodiments, every third surface effective to eject electrons is configured to electrically couple to a respective electrometer. In additional embodiments, the electrometer is configured to electrically couple to a signal converter, e.g., an analog-to-digital converter, ion pulse counter or other suitable signal converter. In other examples, the signal converter is an analog-to-digital converter. In some embodiments, the detector can include a power converter electrically coupled to the electrometer and to the analog-to-digital converter. In certain examples, the detector can include a first processor electrically coupled to each of the surfaces and configured to prevent a current overload at each surface, e.g., each surface can be electrically isolated from other surfaces to provide a signal to the processor. In some embodiments, the processor is configured to measure all surface currents simultaneously. In certain embodiments, the processor is configured to alter the voltage at a saturated surface or a surface upstream or downstream of the saturated surface.

In another aspect, an optical detector comprising a signal amplification device constructed and arranged to receive photons emitted by a sample and to amplify a signal representative of the received photons by secondary ejection of electrons from surfaces, in which at least one surface that is to eject electrons to amplify the signal is electrically coupled to an electrometer is provided.

In certain embodiments, at least two of the surfaces are electrically coupled to a respective electrometer. In some embodiments, every surface is electrically coupled to a respective electrometer. In other embodiments, every third surface is electrically coupled to a respective electrometer. In additional embodiments, each electrometer is electrically coupled to a signal converter, e.g., an analog-to-digital converter, an ion pulse counter or other signal converter. In some examples, the signal converter is an analog-to-digital converter. In other examples, the detector comprises a power converter electrically coupled to each electrometer and analog-to-digital converter pair. In some embodiments, the detector comprises a first processor electrically coupled to each of the plurality of surfaces and configured to prevent a current overload at each surface, e.g., each surface is electrically isolated from other surfaces. In certain examples, the processor is configured to measure all surface currents simultaneously. In certain embodiments, the processor is configured to alter the voltage at a saturated surface or a surface upstream or downstream of the saturated surface.

In an additional aspect, a method of detecting optical emission comprising simultaneously detecting a current signal, e.g., input current signal or output current signal, at each dynode of a plurality of dynodes of a photomultiplier configured to receive photons, and averaging the detected current signals at each dynode that comprises a measured current signal above a noise current signal and below a saturation current signal to determine a mean current is disclosed.

In certain embodiments, the method can include terminating signal amplification at a dynode where a saturation current is measured. In some embodiments, the method can include altering the voltage at a dynode adjacent to the dynode where the saturation current is measured to terminate the signal amplification. In some examples, the method can include determining the mean current by calculating the currents at all dynodes and discarding calculated currents below the noise current signal and above the saturation current signal, scaling each non-discarded calculated current by its respective gain, and averaging the scaled currents to determine the mean current. In certain examples, the method comprises providing a floating voltage to each dynode of the plurality of dynodes. In other examples, the method comprises controlling the voltage at each dynode independently of voltage at the other dynodes of the plurality of dynodes. In further examples, the method comprises measuring the photons without adjusting the gain. In some embodiments, the method comprises measuring optical emission from a plurality of samples comprising different concentrations without adjusting the gain of the photomultiplier. In other embodiments, the method comprises measuring optical emission from a plurality of samples comprising different concentrations without adjusting entry slit width of the photomultiplier. In additional embodiments, the method comprises calculating sample concentration from the determined mean input current.

In another aspect, a method of detecting optical emission comprising simultaneously detecting a current signal, e.g., input current signal or output current signal, of at least two internal dynodes of a photomultiplier configured to receive photons, and averaging the detected current signals at each of the at least two internal dynodes comprising a measured current signal above a noise current signal and below a saturation current signal to determine a mean input current is disclosed.

In certain examples, the method comprises terminating signal amplification at a dynode where a saturation current is measured. In other examples, the method comprises simultaneously detecting a current signal at every other internal dynode of the plurality of dynodes. In further embodiments, the method comprises simultaneously detecting a current signal at every third internal dynode of the plurality of dynodes. In some examples, the method comprises terminating signal amplification at a dynode where a saturation current is measured. In additional examples, the method comprises providing a floating voltage at each detected dynode of the plurality of dynodes. In other examples, the method comprises controlling the voltage at each dynode independently of voltage at the other dynodes of the plurality of dynodes. In some embodiments, the method comprises measuring optical emission from a plurality of samples comprising different concentrations without adjusting the gain of the photomultiplier. In further examples, the method comprises measuring optical emission from a plurality of samples comprising different concentrations without adjusting entry slit width of the photomultiplier. In some embodiments, the method comprises calculating sample concentration from the determined mean current. In some examples, the method comprises determining the mean current by calculating the currents at selected dynodes and discarding calculated currents below the noise current signal and above the saturation current signal, and scaling each non-discarded calculated current by its respective gain and averaging the scaled currents to determine the mean current.

In another aspect, a method of measuring photons comprising separately controlling a bias voltage in each dynode of an optical detector comprising a photocathode, an anode and a plurality of dynodes between the photocathode and the anode to measure the photons is provided.

In certain embodiments, the method comprises regulating the dynode voltage to be substantially constant. In certain examples, the method comprises calculating currents, e.g., input current or output currents, at selected dynodes of the plurality of dynodes, discarding calculated currents below a noise current level and above the saturation current level, scaling each non-discarded calculated current by its respective gain, and averaging the scaled currents to determine a mean current.

In an additional aspect, a method of analyzing a sample comprising amplifying a light signal from the sample by independently measuring a current, e.g., input current or output current, at each of a plurality of dynodes in an optical detector comprising a photocathode, an anode and the plurality of dynodes between the photocathode and the anode is provided. In certain embodiments, the method comprises calculating currents at each dynode of the plurality of dynodes, discarding calculated currents below a noise current level and above the saturation current level, scaling each non-discarded calculated current by its respective gain, and averaging the scaled currents to determine a mean current.

In another aspect, a method of analyzing a sample comprising amplifying a light signal from the sample by independently measuring a current, e.g., input current or output current at two or more of a plurality of dynodes in an optical detector comprising a photocathode, an anode and the plurality of dynodes between the photocathode and the anode is described. In certain examples, the method comprises calculating currents at each of the two or more dynodes of the plurality of dynodes, discarding calculated currents below a noise current level and above a saturation current level, scaling each non-discarded calculated current by its respective gain, and averaging the scaled currents to determine a mean current. In other examples, the method comprises measuring currents from every other dynode of the plurality of dynodes.

In an additional aspect, a system comprising a photocathode, an anode, a plurality of dynodes between the photocathode and the anode, at least one electrometer electrically coupled to one of the plurality of dynodes, and a processor electrically coupled to the at least one electrometer, the processor configured to determine a mean current, e.g., input current or output current, from currents measured by the electrometer. In certain examples, the processor is configured to determine the mean current by calculating currents at the at least one dynode of the plurality of dynodes, discarding calculated currents below a noise current level and above the saturation current level, scaling each non-discarded calculated current by its respective gain, and averaging the scaled currents to determine a mean current. In some examples, the system comprises a second electrometer electrically coupled to a dynode other than the dynode electrically coupled to the electrometer. In additional examples, the processor is configured to determine the mean current by calculating currents at the dynode electrically coupled to the electrometer and at the dynode electrically coupled to the second electrometer, discarding calculated currents below a noise current level and above the saturation current level, scaling each non-discarded calculated current by its respective gain, and averaging the scaled currents to determine a mean current. In some embodiments, each of the plurality of dynodes is electrically coupled to a respective electrometer. In other embodiments, the processor is configured to determine the mean current by calculating currents at each dynode of the plurality of dynodes, discarding calculated currents below a noise current level and above the saturation current level, scaling each non-discarded calculated current by its respective gain, and averaging the scaled currents to determine a mean input current.

Additional attributes, features, aspects, embodiments and configurations are described in more detail herein.

BRIEF DESCRIPTION OF THE FIGURES

Certain features, aspects and embodiments of the signal multipliers are described with reference to the accompanying figures, in which.

Figure 1:
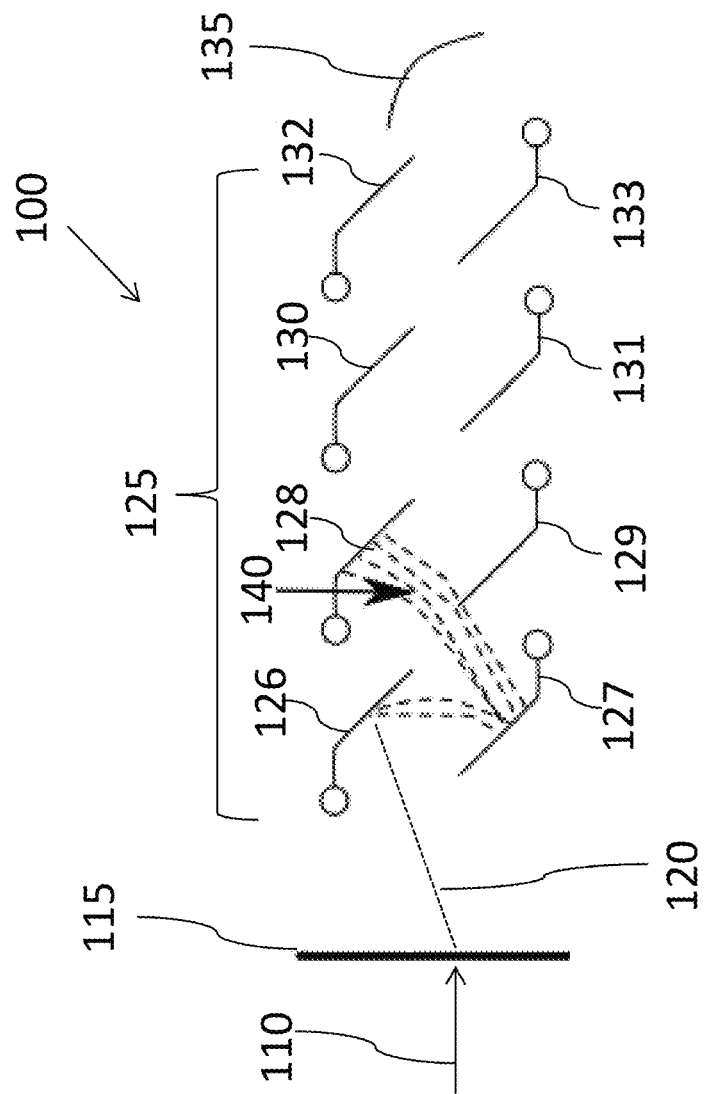
FIG. 1 is an illustration of a detector comprising a photocathode, an anode and a plurality of dynodes between them, in accordance with certain examples.

It will be recognized by the person of ordinary skill in the art, given the benefit of this disclosure, that the components in the figures are not limiting and that additional components may also be included without departing from the spirit and scope of the technology described herein.

DETAILED DESCRIPTION

Certain features, aspects and embodiments described herein are directed to optical detectors and systems using them that can receive incident photons, amplify a signal corresponding to the photons and provide a resulting current or voltage. In some embodiments, the optical detectors and systems described herein can have an extended dynamic range, accepting large electron currents and high levels of light, without damaging or prematurely aging the device. In other instances, the optical detectors and systems may be substantially insensitive to overloading or saturation effects as a result of high concentrations (or high amounts of photons emitted or otherwise provided to the optical detector) while still providing rapid acquisition times and accurate measurements.

In some embodiments, the dynodes of the optical detectors described herein can be used to measure signals, e.g., signals representative of the incident light, in a manner that does not overload the dynodes. For example, the detectors can be configured such that dynodes downstream of a saturated dynode are "shorted out" or not used in the amplification. This configuration can increase the lifetime of the optical detectors and can permit use of the optical detectors over a wide concentration range of sample without having to alter or adjust the gain of the optical detectors for each concentration. For example, the voltage (or current) of each dynode can be monitored and/or used to measure the signal. If desired, dynodes that provide a signal above a noise level and/or below a saturation level can be monitored and grouped together, e.g., to provide a mean signal that can be used to determine concentration or otherwise provide a desired output, e.g., an image, that corresponds to the incident light. Where dynode saturation is measured, signal amplification can be terminated at dynodes downstream of the saturated dynode, or optionally at the saturated dynode itself, to enhance the lifetime of the optical detectors and systems. Reference to the terms "upstream" and "downstream" is understood to refer to the position of one dynode relative to another dynode. For example, a dynode of a photomultiplier that is immediately adjacent to a photocathode would be upstream of a dynode that is immediately adjacent to an anode of the photomultiplier. Similarly, a dynode of a photomultiplier that is immediately adjacent to the anode would be downstream of a dynode that is immediately adjacent to the photocathode of the photomultiplier.

In certain embodiments, the optical detectors and systems described herein have wide applicability to many different types of optical devices including, but not limited to, optical detectors of medical and chemical instrumentation, microscopes, cameras, telescopes, microchannel plate detectors, CT scanners, PET scanners, X-ray detectors, image intensifiers, vision devices, e.g., night vision devices, radiation detectors and other optical devices that amplify light signals to provide a current (or voltage), image or signal representative of incident light. The optical devices may be used with, or may include, one or more scintillators, primary emitters, secondary emitters or other materials to facilitate light detection and/or use of the light to provide an image. Visual imaging components can be used with the measured signals to construct images representative of the light received by the detectors and systems described herein. Examples of these and other optical detectors and systems are described in more detail below.

Certain figures are described below in reference to devices including dynodes or dynodes stages. It will be recognized by the person of ordinary skill in the art, given the benefit of this disclosure, that the exact number of dynodes or dynode stages can vary, e.g., from 5 to 30 or any number in between or other numbers of dynode stages greater than 30, depending on the desired signal amplification, the desired sensitivity of the device and other considerations. In addition, where reference is made to channels, e.g., channels of a microchannel plate device, the exact number of channels may also vary as desired. In some configurations, the dynodes may be present in a continuous dynode device.

In certain embodiments and referring to FIG. 1, certain components of an optical detector 100 are shown. The detector 100 comprises a photocathode 115, an anode 135, and a plurality of dynodes 125-133 between the photocathode 115 and the anode 135. While not shown, the components of the detector 100 would typically be positioned within a tube or housing (under vacuum) and may also include a focusing electrode between the photocathode 115 and the first dynode 126 of the plurality of dynodes 125 to orient the beam from the photocathode 115 at a suitable angle. In use of the detector 100, light beam 110 is incident on the photocathode 115, which converts the optical signal from the light beam 110 into an electrical signal shown as beam 120 by way of the photoelectric effect. In some embodiments, the photocathode 115 can be present as a thin film or layer on an entry aperture of the detector 100. The energy from the light beam 110 is converted by the photocathode 115 into an electrical signal by emission of electrons from the photocathode 115. For example, an incident photon can strike the surface of the photocathode 115 and cause ejection of electrons from the surface of the photocathode 115. The exact number of electrons ejected per photon depends, at least in part, on the work function of the material and the energy of the incident photon. The beam 120 is incident on a downstream dynode 126, which emits secondary electrons in the general direction of the dynode 127. For example, a voltage-divider circuit (as described below), or other suitable circuitry, can be used to provide a more positive voltage for each downstream dynode. The potential difference between the photocathode 115 and the dynode 126 causes electrons ejected from the photocathode to be accelerated toward the dynode 126. The exact level of acceleration depends, at least in part, on the gain used. Dynode 127 is typically held at a more positive voltage than dynode 126, e.g., 100 to 200 Volts more positive, to cause acceleration of electrons emitted by dynode 126 toward dynode 127. As electrons are emitted from the dynode 127, they are accelerated toward downstream dynode 128 as shown by beams 140. A cascade mechanism is provided where each successive dynode stage emits more electrons than the number of electrons emitted by an upstream dynode. The resulting amplified signal is provided to the anode 135, which typically outputs the current to an external circuit through one or more electrical couplers of the optical detector 100. The current measured at the anode 135 can be used to determine the amount of light emitted by a sample. If desired, the measured current can be used to quantitate the concentration or amount of sample using conventional standard curve techniques. In general, the detected current depends on the number of electrons ejected from the photocathode 115, which is proportional to the number of incident photons and the gain of the device 100. Gain is typically defined as the number of electrons collected at the anode 135 relative to the number of electrons ejected from the photocathode 115. For example, if 5 electrons are emitted at each dynode, and the device 100 includes 8 total dynodes, then the gain is $5^8$ or about 390,000. The gain is dependent on the voltage applied to the device 100. For example, if the voltage is increased, the potential differences between dynodes are increased, which results in an increase in incident energy of electrons striking a particular dynode stage.

In some embodiments, the optical detector 100 can be overloaded by permitting too much light to be introduced into the housing and/or by adjusting the gain to be too high. As noted above, the gain of existing optical detectors can be adjusted by changing or adjusting a control voltage to provide a desired signal without saturation of the detector. For example, the operating voltage of a typical detector may be between 800-3000 Volts. Changing the operating voltage can result in a change in the gain. Typical gain values may be from about $10^5$ to about $10^8$. The gain adjustment often takes place from sample to sample to avoid overloading the detector at high sample concentrations (or high amounts of light) and to avoid not providing enough signal amplification at low concentrations of sample (or low levels of incident light). Alternatively, a gain can be selected (by selecting a suitable operating voltage) so that the more intense samples do not saturate the detector. Adjusting the gain from measurement-to-measurement or image-to-image increases sampling time, can reduce detector response time and may lead to inaccurate results. Where the gain is too high, the detector can become overloaded or saturated, which can result in reduced lifetime for the detector and provide inaccurate measurements. Where the gain is too low, low levels of light may go undetected. In certain embodiments described herein, the gain of the detector can be kept constant and can be rendered insensitive to saturation or overloading at high levels or amounts of light entering into the detector. Instead, the current at selected dynode stages can be monitored and used to determine whether or not signal amplification using downstream dynodes should continue or if amplification should be terminated to protect the detector, e.g., to protect the dynode surfaces. The measured current at selected dynode stages can be scaled by their stage gain and then averaged or otherwise used to determine a mean input current signal that is representative of the concentration or amount of light that arrives at the detector. Illustrations of such processes are described in more detail below.

In certain embodiments, each of the dynodes 126-133 (and collectively shown as element 125) of the optical detector 100 can be configured to electrically couple to an electrometer so that the input current (or output current) at each of the plurality of dynodes 125 can be monitored or measured. In some configurations, the voltage difference between each dynode may be around 100 to 200V. As described elsewhere herein, the electrometer may part of an analog circuit or a digital circuit. For example, a solid-state amplifier comprising one or more field-effect transistors can be used to measure the current at each of the plurality of dynodes 126-133. In some instances, each of the plurality of dynodes 126-133 may include a respective solid-state amplifier. If desired, the amplifier can be coupled to one or more signal converters, processors or other electrical components. In combination, the components may provide or be considered a microcontroller comprising one or more channels, e.g., ADC channels. In some embodiments, a single microprocessor can be electrically coupled to one, two or more, e.g., all, of the dynodes such that current values can simultaneously be provided to the processor for the one, two or more, e.g., all, dynodes. Because of the different dynode voltages, the current values can be provided by way of some means of electrically isolating the various signals from each dynode, e.g., optocouplers, inductors, light pipe, IRF devices or other components can be used. For example, each dynode/electrometer pair can be electrically isolated and/or electrically insulated from other dynode/electrometer pairs such that separate signals can be measured from each of the dynodes. In other configurations, a processor electrically coupled to suitable components (as described herein) can monitor current levels at each dynode and can be used to determine a mean input current for determining a concentration of a sample or for constructing an image based on the determined inputs.

Figure 2:
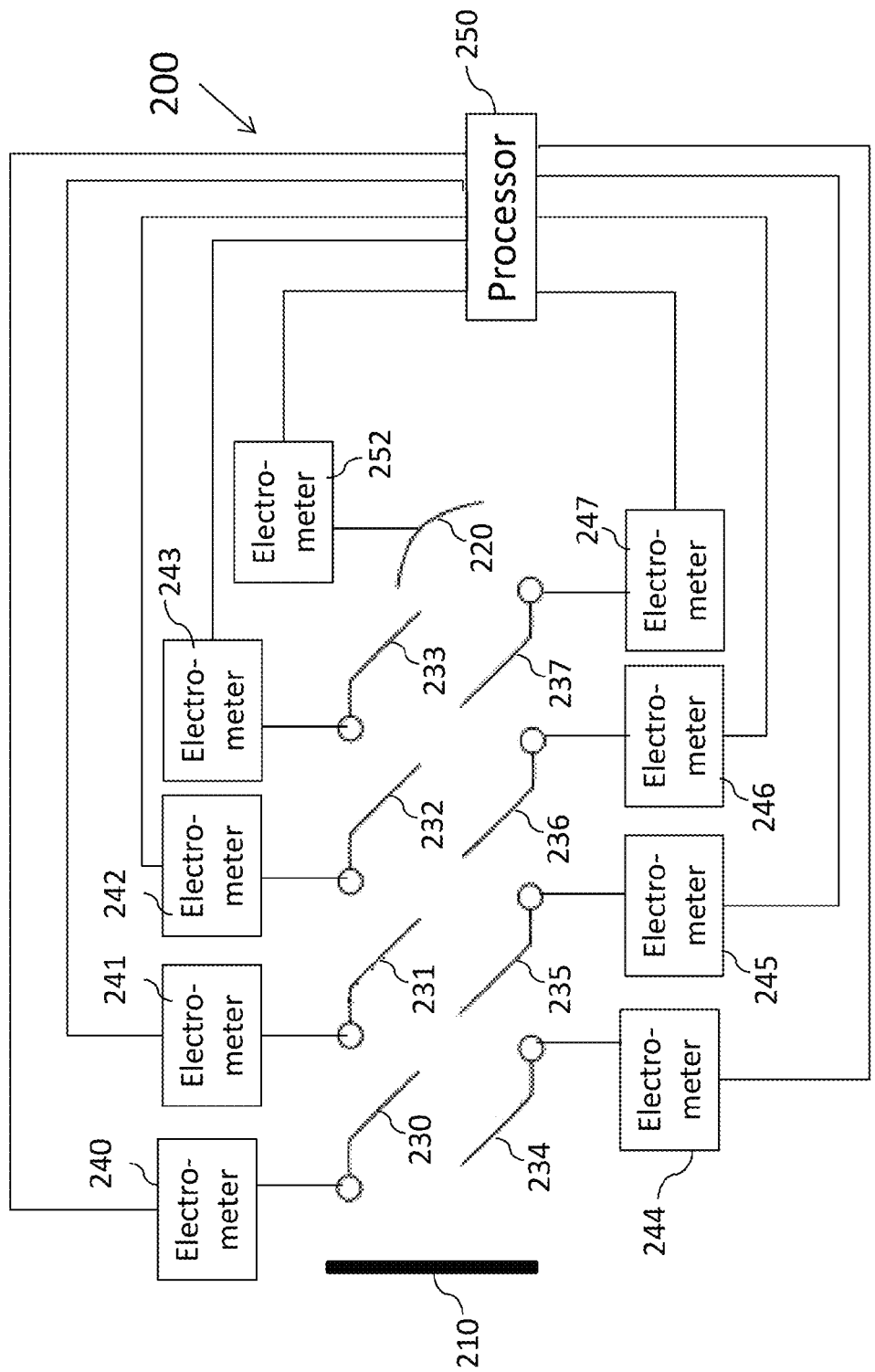
FIG. 2 is an illustration of a detector where each dynode is electrically coupled to an electrometer, in accordance with certain examples.

In certain embodiments and referring to FIG. 2, one configuration of certain components in an optical detector system are shown. In FIG. 2, an optical detector 200 comprises a photocathode 210, an anode 220, and a plurality of dynodes stages 230-237. In the detector 200, each of the dynode stages 230-237 is electrically coupled to a respective electrometer 240-247. The electrometers 240-247 can each be electrically coupled to a first processor 250, e.g., through separate input channels (not shown) of the processor 250. If desired, the anode 220 can also be electrically coupled to an optional electrometer 252. For example, in certain instances it may be desirable to switch operation of the detector 200 from the state where one or more internal dynode currents are monitored to a second state where only current at the anode 220 is monitored. As noted herein, the processor 250 may be present on a printed circuit board, which may include other components commonly found on printed circuit boards including, but not limited to, I/O circuits, data buses, memory units, e.g., RAM, clock generators, support integrated circuits and other electrical components. While not shown, the dynodes/electrometer pairs of the detector 200 may be electrically isolated from each other to provide separate signals to the first processor 250.

Figure 3:
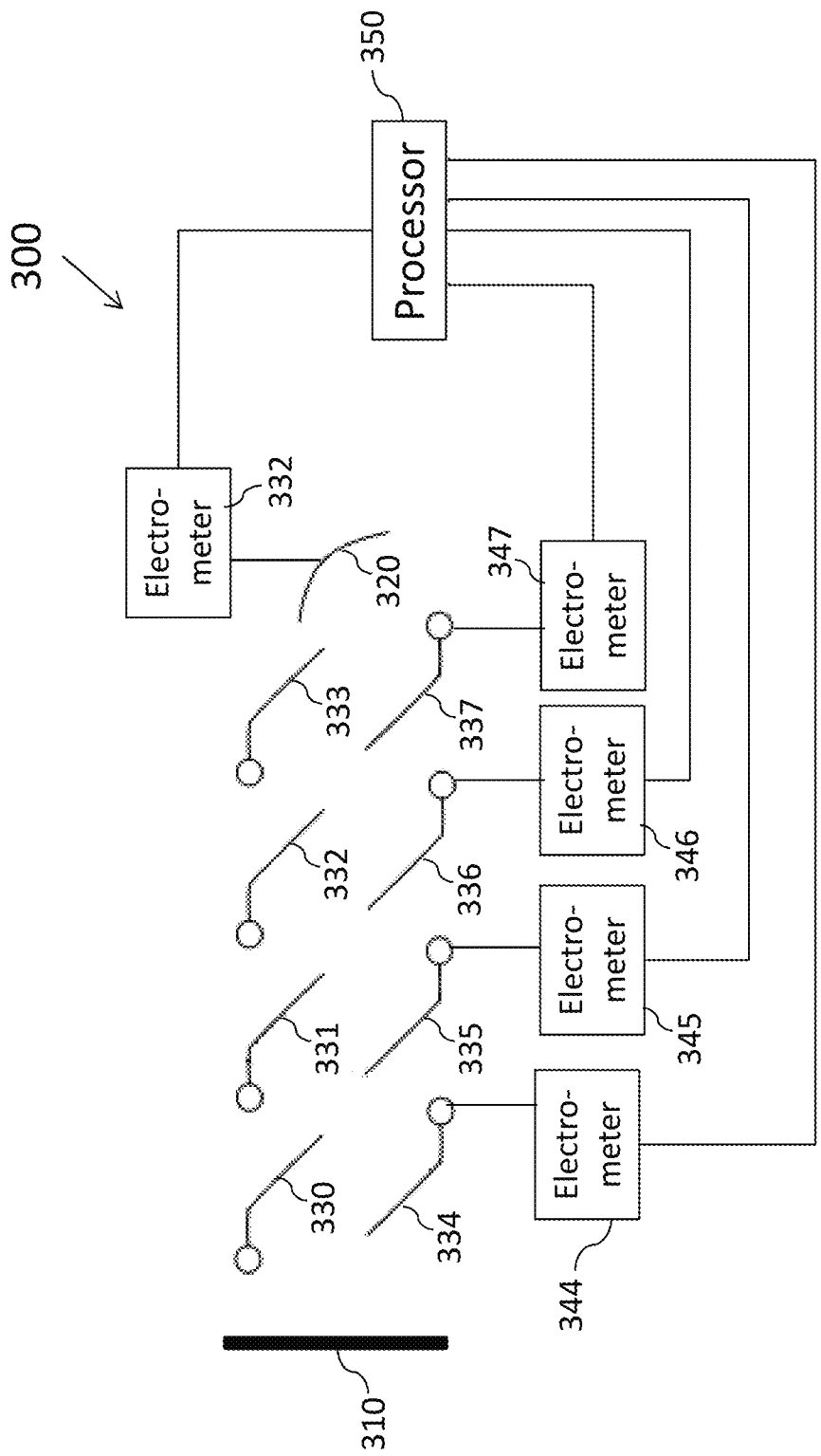
FIG. 3 is an illustration of detector where every other dynode is electrically coupled to an electrometer, in accordance with certain examples.

In other embodiments and referring now to FIG. 3, it may not be desirable to monitor the current at each dynode of the detector. For example, in an optical detector 300, every other dynode is electrically coupled to an electrometer. The detector 300 comprises a photocathode 310, an anode 320, and a plurality of dynodes stages 330-337 are shown. In the detector 300, every other dynode stage is electrically coupled to a respective electrometer. For example, dynode stages 330-333 are not electrically coupled to an electrometer, and each of dynode stages 334-337 is electrically coupled to a respective electrometer 344-347. The electrometers 344-347 can each be electrically coupled to a first processor 350, e.g., through separate input channels (not shown) of the processor 350. If desired, the anode 320 can also be electrically coupled to an optional electrometer 352. As noted herein, the processor 350 can be present on a printed circuit board, which may include other components commonly found on printed circuit boards including, but not limited to, I/O circuits, data buses, memory units, e.g., RAM, clock generators, support integrated circuits and other electrical components. By configuring the detector with an electrometer on every other electrode, detector fabrication and reduced circuitry can be implemented. As noted in more detail below, selected current inputs from the detector 300 can be used to determine a mean input current, which can be used for calculating a sample concentration, reconstructing an image or for other means. While the configuration shown in FIG. 3 illustrates an electrometer being present at every other dynode, it may be desirable to include an electrometer on adjacent dynodes followed by a dynode stage without an electrometer rather than spacing the electrometers on an every other dynode basis. For example, where a detector comprises eight dynodes and four electrometers, it may be desirable to omit electrometers from all stages except the final four dynode stages 332, 333, 336 and 337. While not shown, the dynodes/electrometer pairs of the detector 300 may be electrically isolated from each other to provide separate signals to the first processor 350.

Figure 4:
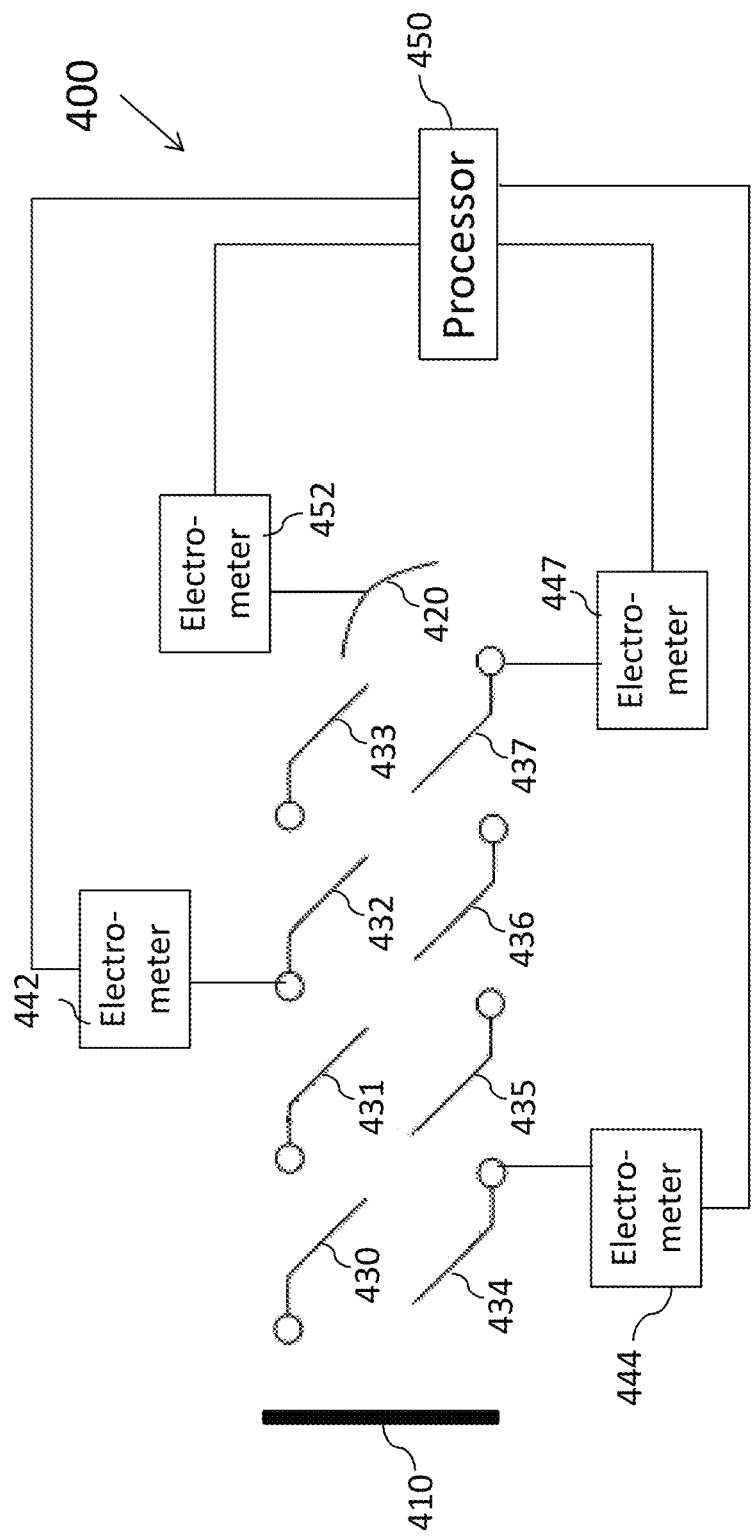
FIG. 4 is an illustration of a detector where every third dynode is electrically coupled to an electrometer, in accordance with certain examples.

In additional embodiments and referring to FIG. 4, it may be desirable to configure the detector with an electrometer on every third dynode. For example, a detector 400 comprises a photocathode 410, an anode 420 and a plurality of dynodes 430-437 between the photocathode 410 and the anode 420. In the detector 400, every third dynode stage is electrically coupled to a respective electrometer. For example, each of dynode stages 434, 432 and 437 is coupled to an electrometer, 444, 442 and 447, respectively, and all other dynode stages are not coupled to an electrometer. The electrometers 444, 442 and 447 can each be electrically coupled to a first processor 450, e.g., through separate input channels (not shown) of the processor 450. If desired, the anode 420 can also be electrically coupled to an optional electrometer 452. While three electrometers are shown as being present in the detector 400, the three electrometers could, if desired, be positioned together in the middle of the dynode stages, together toward one end of the dynode stages or spaced in some other manner than every third dynode. For example, it may be desirable to omit electrometers from all stages except the final three dynode stages 433, 436 and 437. Additional configurations of a detector comprising three electrometers each electrically coupled to a respective dynode will be readily selected by the person of ordinary skill in the art, given the benefit of this disclosure. While not shown, the dynodes/electrometer pairs of the detector 400 may be electrically isolated from each other to provide separate signals to the first processor 450.

Figure 5:
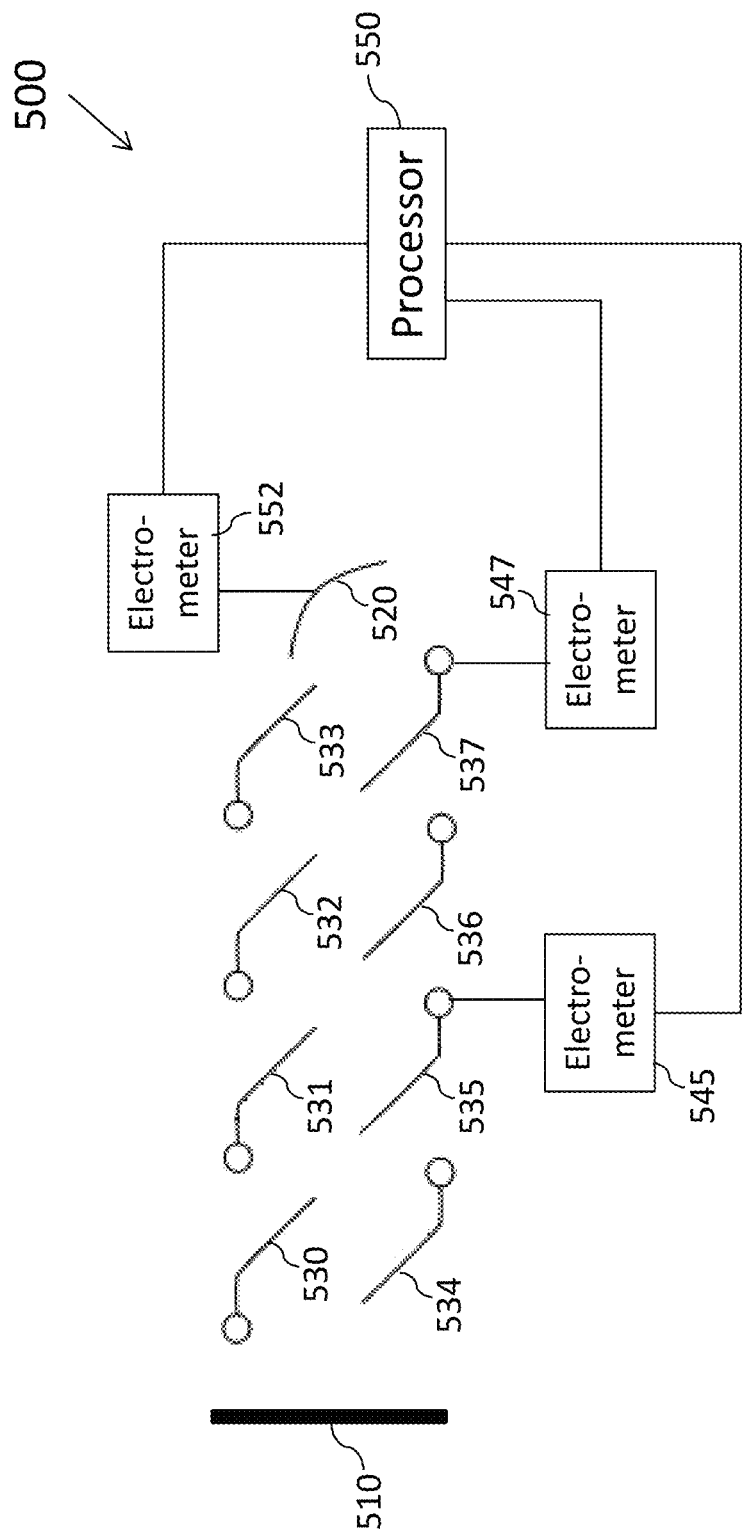
FIG. 5 is an illustration of a detector where every fourth dynode is electrically coupled to an electrometer, in accordance with certain examples.

In other embodiments and referring to FIG. 5, it may be desirable to configure the detector with an electrometer on every fourth dynode. For example, a detector 500 comprises a photocathode 510, an anode 520 and a plurality of dynodes 530-537 between the photocathode 510 and the anode 520. In the detector 500, every fourth dynode stage is electrically coupled to a respective electrometer. For example, each of dynode stages 535 and 537 is coupled to an electrometer, 545 and 547, respectively, and all other dynode stages are not coupled to an electrometer. The electrometers 545 and 552 can each be electrically coupled to a first processor 550, e.g., through separate input channels (not shown) of the processor 550. If desired, the anode 520 can also be electrically coupled to an optional electrometer 552. While two electrometers are shown as being present in the detector 500, the two electrometers could, if desired, be positioned together in the middle of the dynode stages, together toward one end of the dynode stages or spaced in some other manner than every fourth dynode. For example, it may be desirable to omit electrometers from all stages except the final two dynode stages 533 and 537. Additional configurations of a detector comprising two electrometers each electrically coupled to a respective dynode will be readily selected by the person of ordinary skill in the art, given the benefit of this disclosure. While not shown, the dynodes/electrometer pairs of the detector 500 may be electrically isolated from each other to provide separate signals to the first processor 550.

Figure 6:
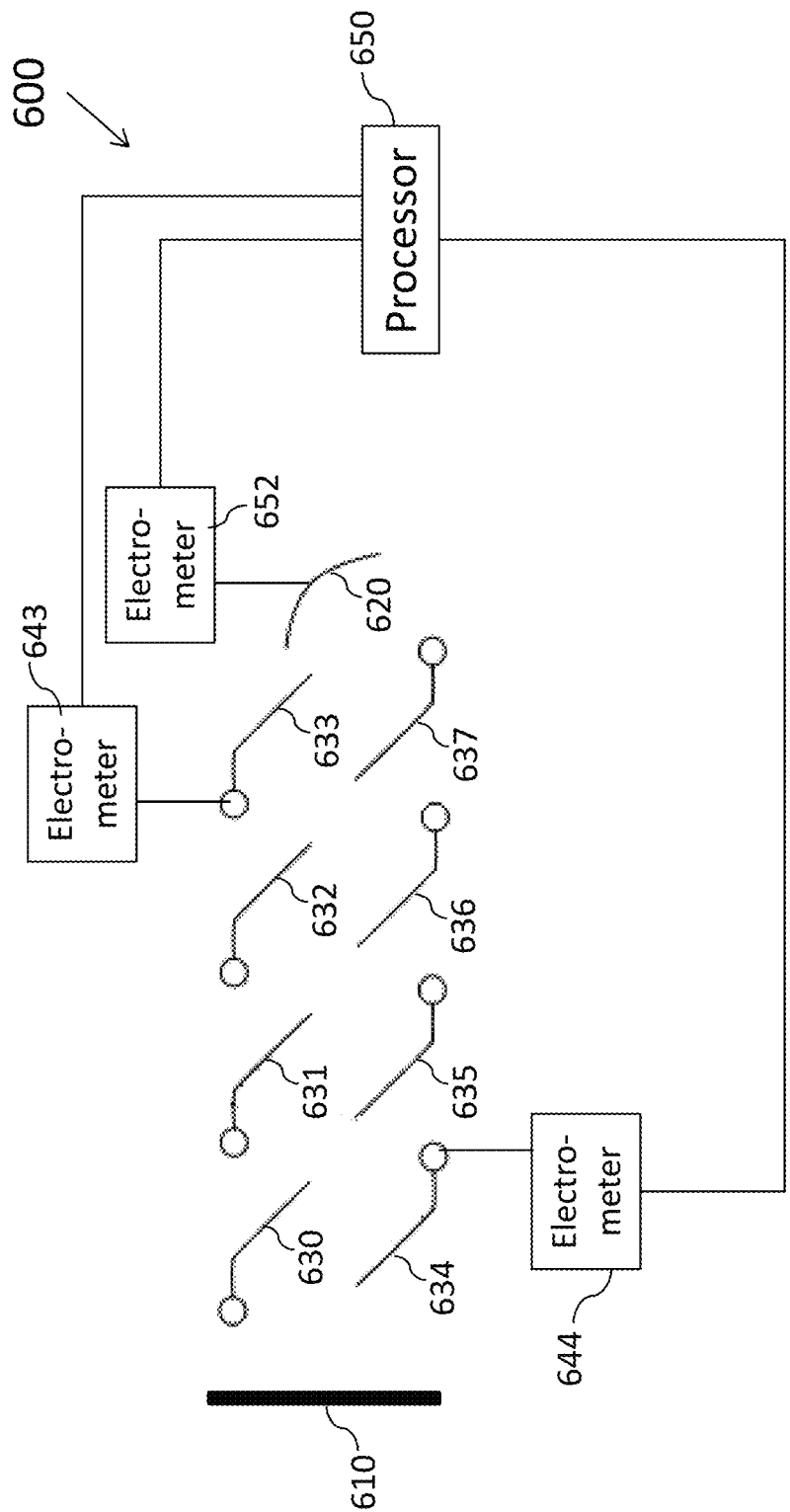
FIG. 6 is an illustration of a detector where every fourth dynode is electrically coupled to an electrometer, in accordance with certain examples.

In some examples, it may be desirable to configure the detector with an electrometer on every fifth dynode. For example and referring to FIG. 6, a detector 600 comprises a photocathode 610, an anode 620 and a plurality of dynodes 630-637 between the photocathode 610 and the anode 620. In the detector 600, every fifth dynode stage is electrically coupled to a respective electrometer. For example, each of dynode stages 633 and 634 is coupled to an electrometer 643 and 644, respectively, and all other dynode stages are not coupled to an electrometer. The electrometers 643 and 644 can each be electrically coupled to a first processor 650, e.g., through separate input channels (not shown) of the processor 650. If desired, the anode 620 can also be electrically coupled to an optional electrometer 652. While two electrometers are shown as being present in the detector 600, the two electrometers could, if desired, be positioned together in the middle of the dynode stages, together toward one end of the dynode stages or spaced in some other manner than every fifth dynode. In addition, the electrometer coupling need not occur on the second and seventh dynode stages 634 and 633, respectively, but instead may be present on the first dynode 630 and sixth dynode 636, the third dynode 631 and the eighth dynode 637 or other dynodes spaced apart by four dynode stages. While not shown, the dynodes/electrometer pairs of the detector 600 may be electrically isolated from each other to provide separate signals to the first processor 650.

While FIGS. 2-6 show particular electrometer spacing, where more than eight dynode stages are present, the spacing may be different than the particular spacing shown in FIGS. 2-6. For example, the spacing may be greater than every fifth dynode where more than eight dynodes are present, may be concentrated toward the middle dynode stages, may be concentrated toward dynode stages near the anode or may otherwise be spaced in a desired or selected manner. In some instances where a twenty-six dynode electron multiplier is used, a first electrometer may be present at a mid-point, e.g., electrically coupled to dynode 13, and a second electrometer can be positioned upstream of dynode 13 or downstream of dynode 13.

Figure 7:
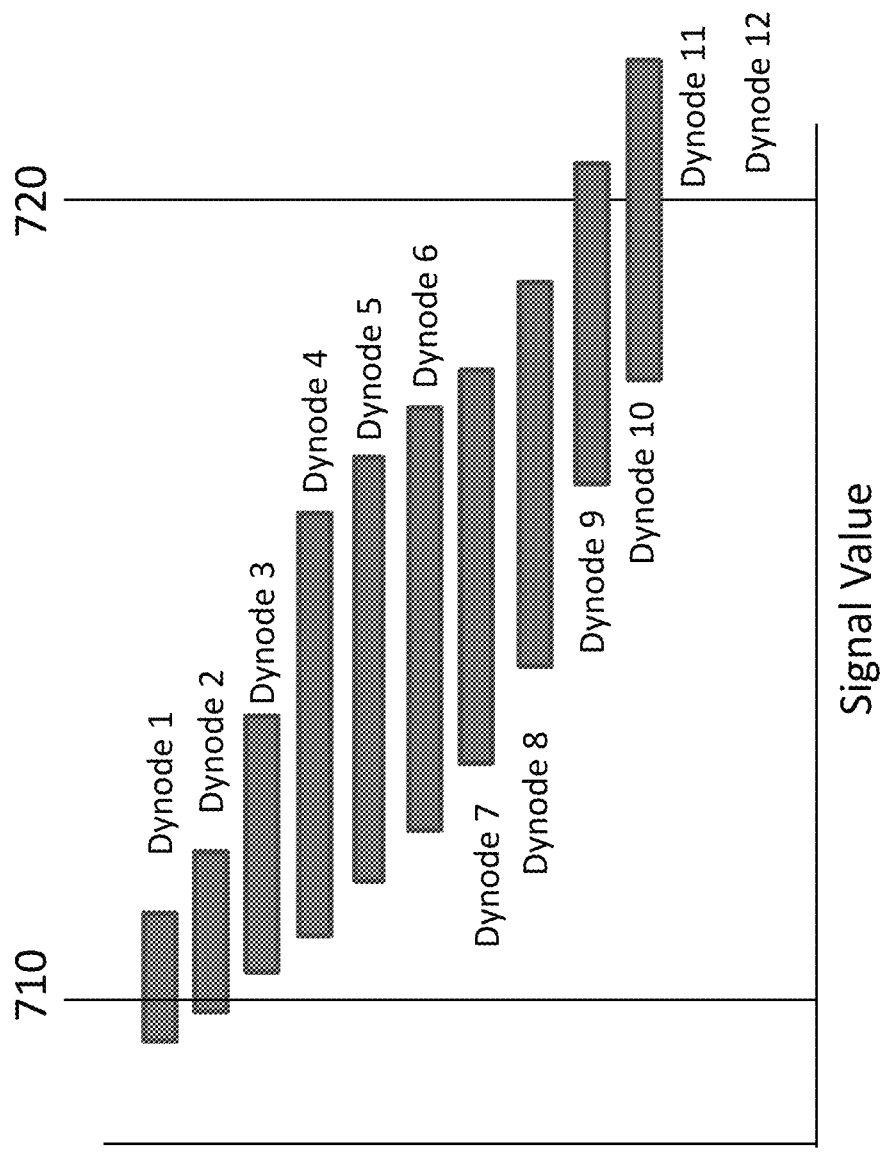
FIG. 7 is a chart showing a signal intensity range for each of a plurality of dynodes, in accordance with certain examples.

In certain embodiments, in operation of the detectors and systems described herein, the signal, e.g., input current or output current, can be monitored at the various dynode stages, e.g., this current will be an input current if the next dynode is positively biased or an output current otherwise. This signal can be used to determine a mean current signal, which may be used for qualitative purposes, quantitative purposes or used in image construction. Referring to the schematic shown in FIG. 7, illustrative signal values for a detector comprising twelve dynode stages is shown. The bars for each dynode represent the dynamic range of each of the dynodes. For exemplary purposes, dynode 1 is considered to be the dynode immediately adjacent to and downstream of the photocathode (or where the detector does not include a photocathode, dynode 1 is the dynode closest to an opening aperture that receives the incident light from a sample or light reflected or emitted from an object). A lower signal limit 710 can be selected by the processor such that an output signal below the lower limit is considered to be within the noise, e.g., has a signal-to-noise ratio of less than 3. These signals can be discarded. Similarly, an upper signal limit 720 can be selected where values above the upper limit are considered to be saturated dynodes. These values can also be discarded by the processor. Additionally, as described below, where a saturated dynode is detected, dynodes downstream of the saturated dynode can be shorted out, making the saturated dynode function as a collector plate to pull out all electrons to protect the detector. No signals are shown in FIG. 7 for dynodes 11 and 12 as those dynodes are downstream of the saturated dynode (dynode 10). The remaining values within the selected current window (signals for dynodes 3-9) can be used to determine a mean signal. For example, if the output current is monitored and the gain of the dynode stages is known, then a mean signal can be determined for the various dynode stages using the current and the gain values. Alternatively, the input current at each dynode can be measured and converted simultaneously. For example, the input current can be computed at each dynode using the gain curve of the dynodes. The input currents (for all input current below saturated dynodes and input currents above dynodes above the signal-to-noise) can simultaneously be averaged, e.g., after normalizing each using the gain, to determine a mean input current that corresponds to the light signal incident on the optical detector. Additionally, the detector can be configured to shut down dynodes where saturation is observed. For example, if saturation is observed at any dynode stage, then that dynode stage or subsequent downstream dynode stages can be shut down, e.g., by altering the voltage at downstream dynodes to stop the cascade, to protect the remaining dynodes of the detector, which can extend detector lifetimes. The averaging of signals and monitoring of individual dynodes can be performed in real time to extend the dynamic range of the detectors, e.g., the dynamic range can be extended by the gain.

Figure 8:
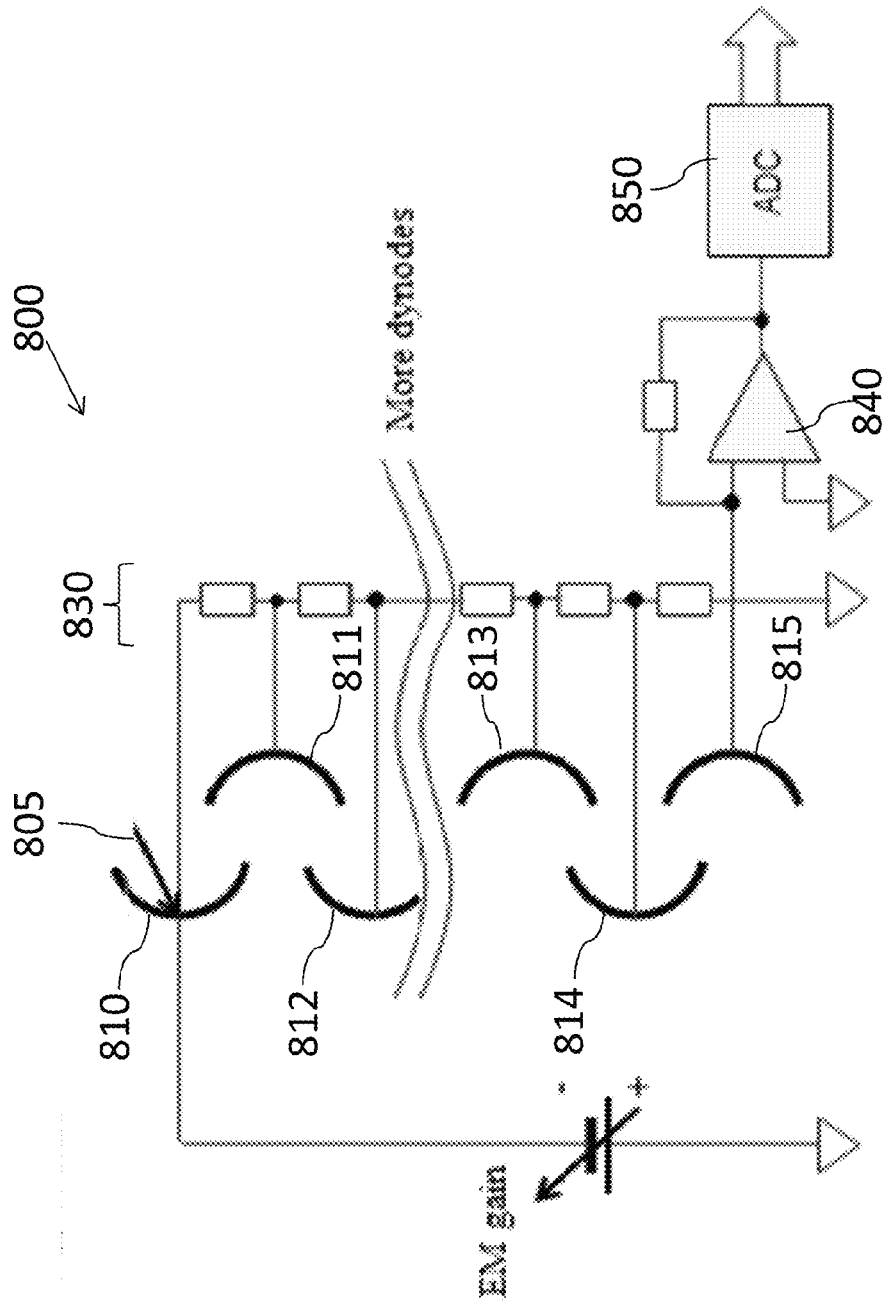
FIG. 8 is an illustration showing the use of a resistor ladder to control the voltage of dynodes in a detector, in accordance with certain examples.

In certain embodiments and referring to FIG. 8, a conventional schematic of certain components of a detector are shown. Five dynodes 810-815 of the detector 800 are shown, though as indicated by the curved lines between dynodes 812 and 813 additional dynode stages can be present. The detector 800 also includes a photocathode (not shown) upstream of the dynode 810. A resistor ladder 830 is used to electrically bias downstream dynodes to have a more positive voltage than upstream dynodes, which results in acceleration of electrons and amplification of the signal 805. For example, the voltage of the first dynode 810 is selected such that electrons striking the dynode 810 will be ejected and accelerated toward the second dynode 811. The bias voltage of the various dynodes 810-814 is achieved by selecting suitable resistor values in the resistor ladder 830. For example, the resistor values are selected to supply the difference between the input current minus the output current for each dynode, while substantially maintaining the bias voltage. As shown in FIG. 8, an amplifier 840, e.g., an amplifier with feedback, that is electrically coupled to an analog-to-digital converter 850 can be present to send digital signals to a processor (not shown) for measuring the current at the dynode 815.

Figure 9:
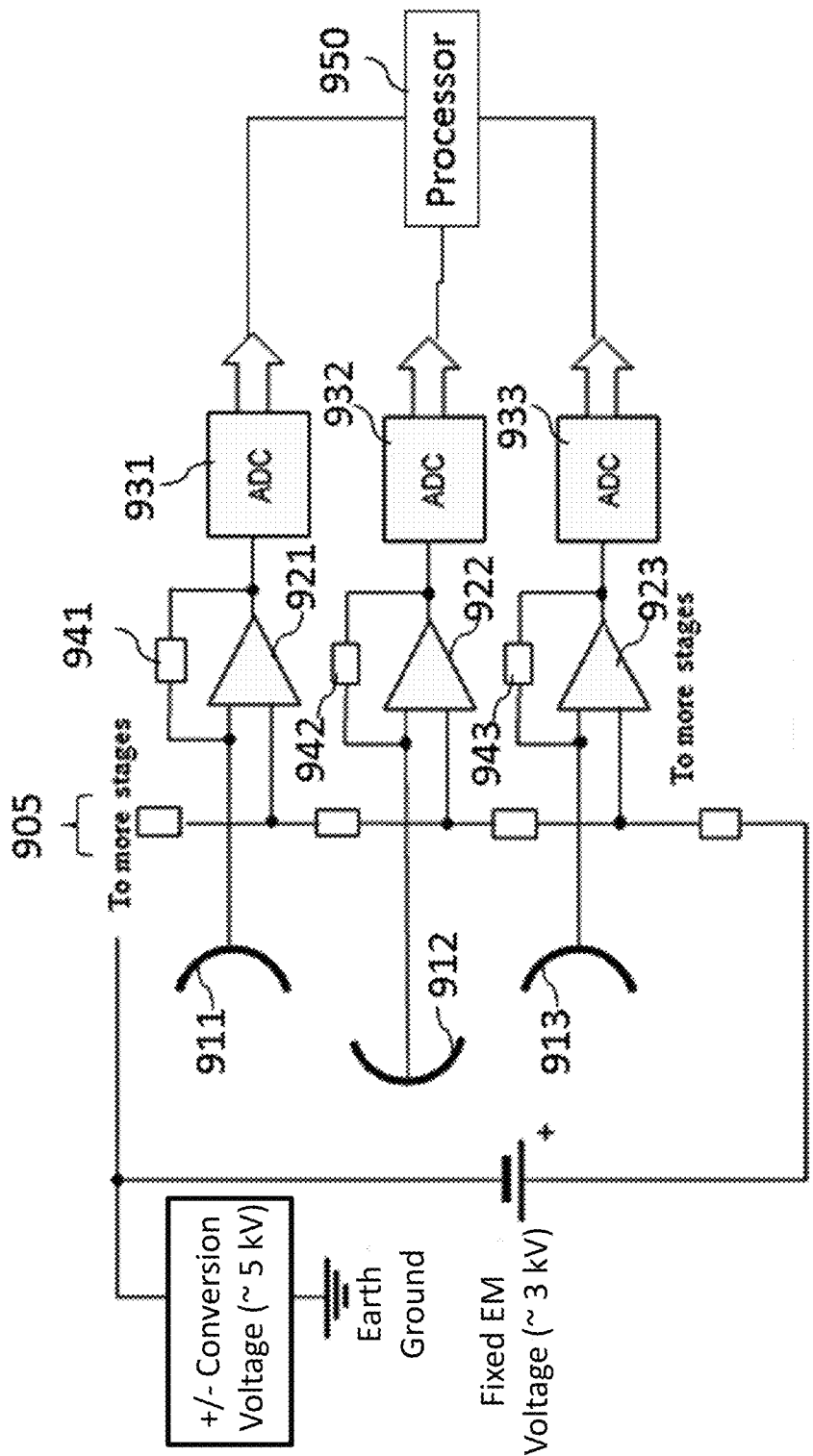
FIG. 9 is an illustration showing the use of a plurality of electrometers each electrically coupled to a respective dynode, in accordance with certain examples.

In certain configurations of the detectors described herein, the supplied current to each dynode can be a direct measure of the electron current. An electrometer can be used to measure the input current at each dynode without disturbing or altering the other dynode stages. Generally, an amplifier can be coupled to each dynode bias voltage to create a virtual ground at the bias voltage. The output voltage with respect to the virtual ground is proportional to the dynode current multiplied by the resistance of the feedback resistor. Each signal from the amplifier can then be converted, e.g., using an analog-to-digital converter, and the resulting values can be provided to a processor through some means of electrical insulation (or electrical isolation or both) for use in determining a mean input or output current from those signals below a saturation level and above a noise level. One illustration of such a configuration is shown in FIG. 9 where three dynode stages are shown for representative purposes. A dynode 911 is shown as being electrically coupled to an amplifier 921 and a signal converter 931. A resistor 941 is electrically coupled to the amplifier 921. The amplifier 921 is coupled to the dynode bias voltage of dynode 911 to create a virtual ground at the bias voltage. The dynode bias voltage can be provided using resistor ladder 905 as described, for example, in reference to the resistor ladder of FIG. 8. The output voltage with respect to the virtual ground is proportional to the current from the dynode 911 multiplied by the resistance of the feedback resistor 941. The output from the amplifier 921 can then be converted by signal converter 931, and the resulting value can be provided to a processor 950 for use in determining a mean input current if the signal from the dynode 911 is within an acceptable signal window, e.g., is within a window or range between a saturation level signal and a noise level signal. The input current (or output current) at dynode 912 may also be measured in a similar way. In particular, an amplifier 922 is electrically coupled to the dynode 912 and to a signal converter 932. A resistor 942 is electrically coupled to the amplifier 922. The amplifier 922 is coupled to the dynode bias voltage of dynode 912 to create a virtual ground at the bias voltage. The output voltage with respect to the virtual ground is proportional to the current from the dynode 912 multiplied by the resistance of the feedback resistor 942. The output from the amplifier 922 can then be converted by signal converter 932, and the resulting value can be provided to the processor 950 for use in determining a mean input current if the signal from the dynode 912 is within an acceptable signal window, e.g., is within a window or range between a saturation level signal and a noise level signal. The current may be measured at dynode 913 in a similar way using the amplifier 923, the signal converter 933, the feedback resistor 943 and the processor 950. If desired, digital signals can be provided such that measured currents within an acceptable window comprise words or signals that are used by a processor to determine a mean input current, and signals that are not acceptable, e.g., within the noise or representative of saturated signals, are coded differently, e.g., have different words or signals, and are not used by the processor in the calculation.

Figure 10:
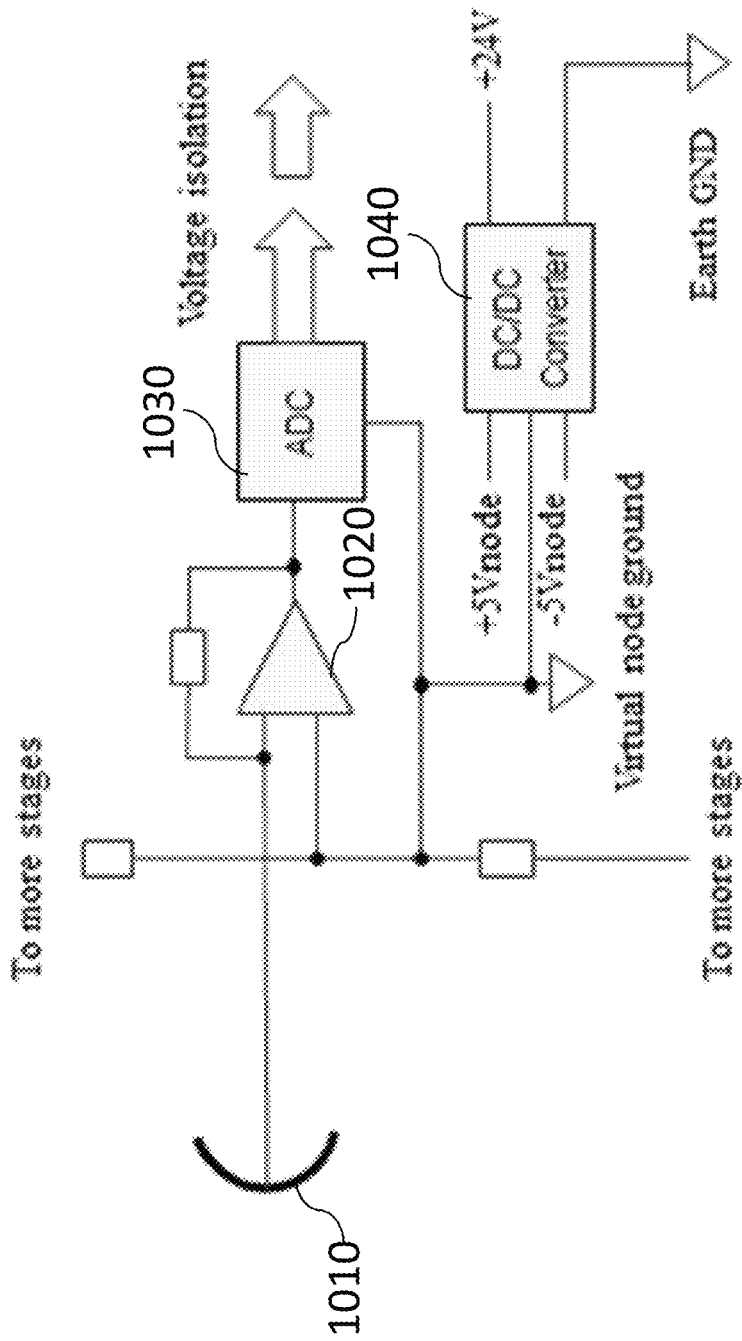
FIG. 10 is an illustration showing a power converter electrically coupled to an amplifier to provide power to the amplifier, in accordance with certain examples.

In certain examples, while all three dynodes in FIG. 9 are shown as including a respective electrometer, it may be desirable to include only two electrometers, e.g., the current at dynode 912 may not be monitored. In some embodiments described herein, the detectors and system can include two, three, four, five or more electrometers coupled to internal dynodes, e.g., those between a first dynode and an anode, to provide sufficient signals in determining mean input signals. If desired, each internal dynode can include a respective electrometer to increase the overall accuracy of the measurements. In certain embodiments where the electrometer floats at the dynode bias voltage, the power for each electrometer and any associated signal converters can be provided from a floating DC/DC converter. Referring to FIG. 10, a single dynode 1010 is shown as being electrically coupled to an amplifier 1020. The amplifier 1020 floats at the bias voltage of the dynode 1010. A floating DC/DC converter 1030 can be electrically coupled to the amplifier 1020 and a signal converter 1040 to provide power to these components. The DC/DC converter 1030 typically converts a higher voltage, e.g., 24 Volts, to a lower voltage, e.g., 5 Volts, that is provided to the amplifier 1020 and the signal converter 1040. Power converters other than DC/DC converters may also be used in the configuration shown in FIG. 10 to provide power to the electrometer. If desired, each dynode can be electrically coupled to a power converter. In some embodiments, only those dynodes electrically coupled to an electrometer are also electrically coupled to a power converter. If desired, the first dynode 1010 can be held at a fixed offset, which can assist in keeping the electron conversions constant.

Figure 11:
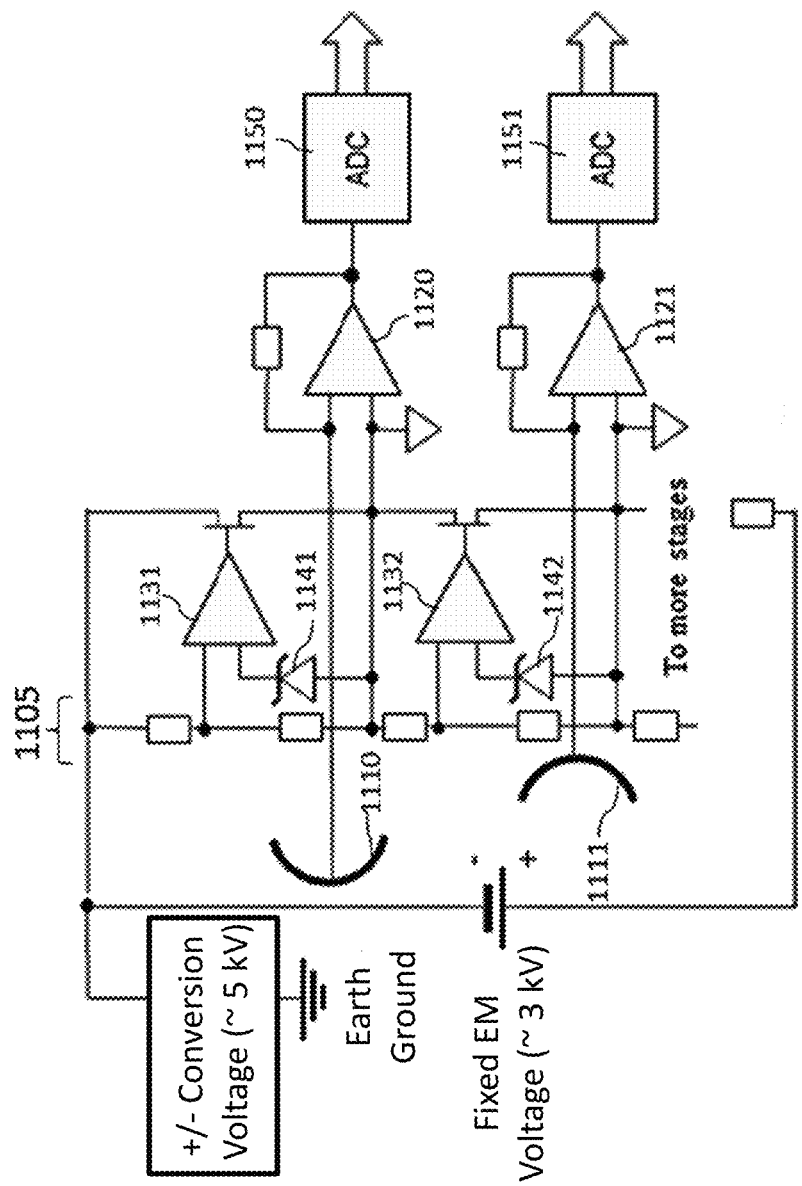
FIG. 11 is an illustration showing an circuit configured to provide separate control of the dynode bias voltages in a detector, in accordance with certain examples.

In certain examples, the dynode bias voltage, as described herein, can be provided by selecting suitable resistors in the resistor ladder. This configuration changes the dynode to dynode voltage and can introduce errors. For example, at 3 kV, an error up to 3 Watts can be introduced. To avoid this error, it may be desirable to regulate each dynode voltage to reduce any errors that may be introduced from voltage changes with increased electron currents. One configuration that permits controlling the dynode voltages separately is shown in FIG. 11. To achieve a substantially constant voltage, a Zener diode or a regulated amplifier can be used. The device includes dynodes 1110 and 1111 electrically coupled to amplifiers 1120 and 1121, respectively, similar to the configuration described in reference to FIG. 10. An amplifier 1131 can be electrically coupled to the resistor ladder 1105 and to a Zener diode 1141 to provide for independent control of the voltage provided to the dynode 1110. For example, the Zener diode 1141 is electrically coupled to an input of the amplifier 1131 to provide for additional control of the bias voltage for the dynode 1110, e.g., to limit or clip the voltage if desired or needed and generally aid in providing a bias voltage to the dynode 1110 that does not vary substantially as electron currents increase at other dynodes of the detector. Similarly, a Zener diode 1142 is electrically coupled to an input of an amplifier 1132 to permit control of the bias voltage to dynode 1111. An electrometer can be electrically coupled to each of the dynodes 1110 and 1111. For example, an amplifier 1120 can be electrically coupled to the dynode 1110 and used to provide a signal to a signal converter 1150, which may convert the signal, e.g., to a digital signal, and provide the converted signal to a processor (not shown). Similarly, an amplifier 1121 can be electrically coupled to the dynode 1111 and used to provide a signal to a signal converter 1151, which may convert the signal, e.g., to a digital signal, and provide the converted signal to a processor (not shown). Where the detector includes more than two dynodes, there can be multiple voltage controllers, e.g., similar to the amplifier/Zener diode combination shown in FIG. 11, between dynodes to separately control the dynode to dynode voltage of the detector. If desired, there need not be voltage control between each dynode node. For example, it may be desirable to omit voltage control between certain dynodes to simplify the overall construction of the detector. In the configuration shown in FIG. 11, the resistor chain can use very low current, e.g., less than 0.1 mA, which reduces generated heat and current demand on the detector power supply, which is typically a 3 kV power supply.

In certain embodiments, at high levels of incident light, the downstream dynodes, e.g., those closer to the anode, may begin to saturate. For example, as the input current increases, the downstream dynode stages will start to saturate the amplifiers and the signal converters. While the electronics are not likely to be damaged from saturation, the materials present on the dynode that eject electrons can be damaged. Damage or deterioration of the dynode surface can result in a change in the local gain of a particular dynode, which can lead to measurement errors. Desirably, the dynode voltages are selected to overlap well with the dynamic range of each detector. It is desirable, for example, to overlap more than 50% to achieve a linear output. Where such a gain is selected for a certain light intensity and a subsequent measurement is performed with incident light of higher intensity, it may be desirable to stop the amplification of the signal at a dynode where saturation is detected. In some embodiments, the saturated dynode may be the last dynode where the signal is amplified, e.g., the saturated dynode may function as an anode, whereas in other examples, a dynode downstream of the saturated dynode can be shorted out to act like an anode to remove all electrons. Many different mechanisms can be used to terminate signal amplification. In one embodiment, the bias voltage of a dynode adjacent to and downstream of a saturated dynode can be adjusted such that electrons are not accelerated from the saturated dynode toward the adjacent dynode. In this manner, the signal amplification will be interrupted at the saturated dynode.

Figure 12:
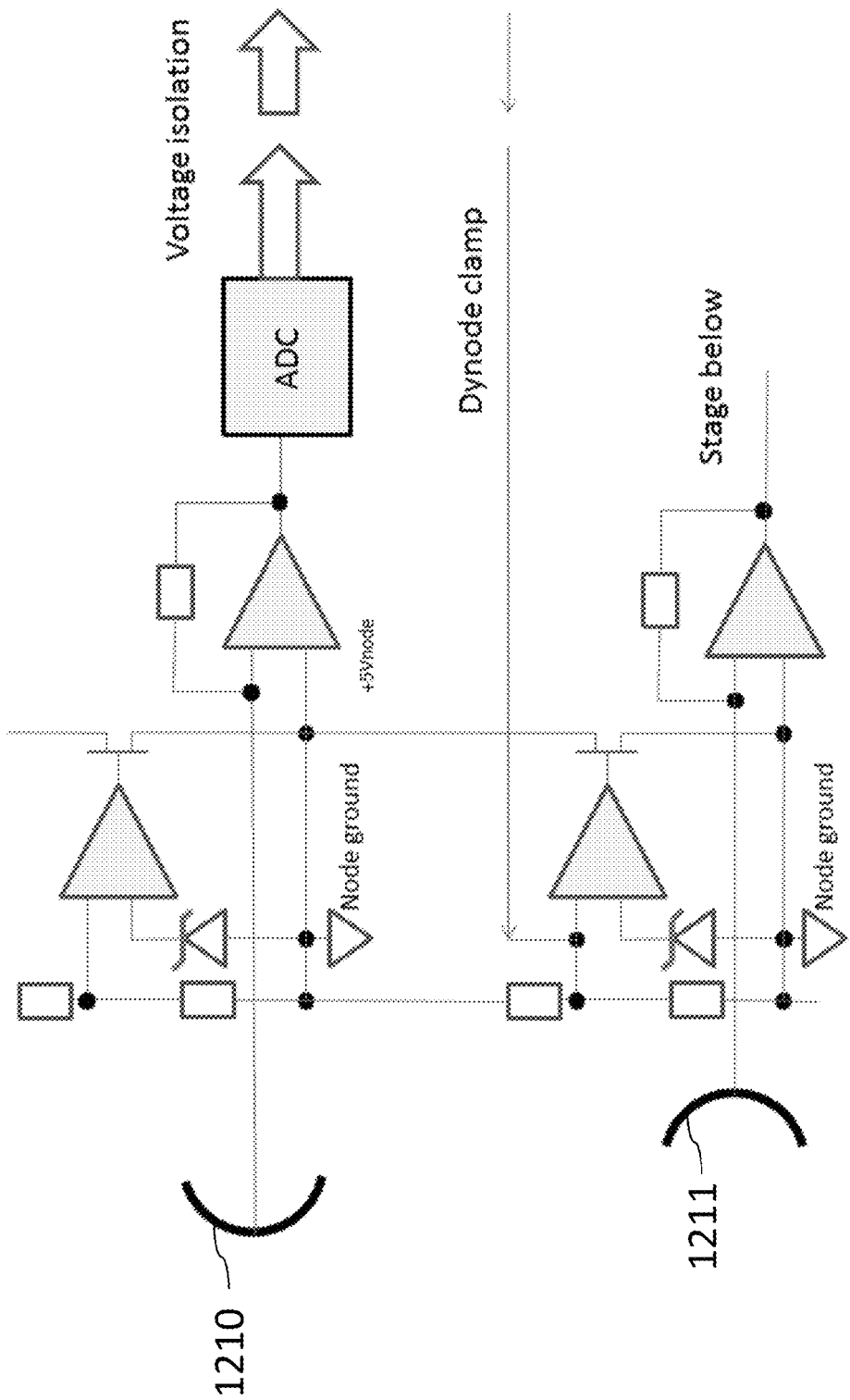
FIG. 12 is a schematic of a circuit configured to terminate amplification of a signal in response to saturation of a dynode, in accordance with certain examples.

Referring to FIG. 12, a schematic is shown of a circuit that can be implemented to terminate signal amplification in the detectors and systems described herein. The components not labeled in FIG. 12 are similar to those described and shown in reference to FIG. 11. At the saturation level, a downstream dynode 1211 (downstream relative to a saturated dynode 1210) can be biased slightly positive in respect to the saturated dynode 1210. For example, the node can shorten the voltage divider on the dynode stage below, to +5V node of the saturation dynode. If a reference voltage of about 2 Volts is present, the dynode 1211 below will end up about +3V over the saturated dynode. The output signal of the saturated dynode will become an anode and will collect all electron currents. The ADC will saturate in the reverse polarity. If desired, this configuration can be used to clamp the dynode gain voltage directly, or can be detected by the control system. For example, as the incident signal changes, the particular dynode where signal termination occurs may change from measurement to measurement. Desirably, the protection switching speed can be close to the ADC conversion speed, so signal termination can be implemented before any damage to downstream dynodes can occur.

It is a substantial attribute of embodiments described herein that by stopping the signal amplification at a saturated dynode (or a dynode downstream from a saturated dynode), the gain of the device can be fixed and not user adjustable. For example, in a detector operated at a fixed gain and with 26 dynodes, if saturation is detected at dynode 23, then amplification may be terminated by shorting out the amplification at the dynode 23. For a subsequent measurement or receipt of photons at the same fixed gain, the number of photons (or photon intensity) may be such that saturation occurs at dynode 19. Amplification can be terminated at dynode 19 without having to adjust the gain, as would be required when using a typical photomultiplier tube. In this manner, a single fixed gain can be selected, and the detector can monitor the input currents of the dynodes to determine when signal amplification should terminate. One result of such configurations is extending the dynamic range of the detector without loss of linearity or detection speed. For example, if the current at each dynode is measured, then the dynamic range is extended by the gain. If a 16-bit analog-to-digital converter is used, then this is 65 k ($2^{16}$) times the gain. Where the system is designed to terminate amplification at a saturated dynode, the detector can be operated at a maximum voltage, e.g., 3 kV, to provide a maximum gain. At this voltage, a gain of $10^7$ would be anticipated in many detectors. To account for noise and assuming a signal-to-noise of 10:1 for a single photon event, the dynamic range would be reduced by a factor of 10. The total dynamic range when using a 16-bit ADC on every dynode would be expected to be about $6 \times 10^{10}$ (65,000 times $10^6$). If conversion of the readings occurs at a frequency of 100 kHz, then about 100,000 different sample measurements can be averaged to expand the dynamic range to a total dynamic range of about $6 \times 10^{15}$. For a particular sample, different samples varying greatly in intensities can be scanned and detected without having to alter the gain of the detector.

Figure 13:
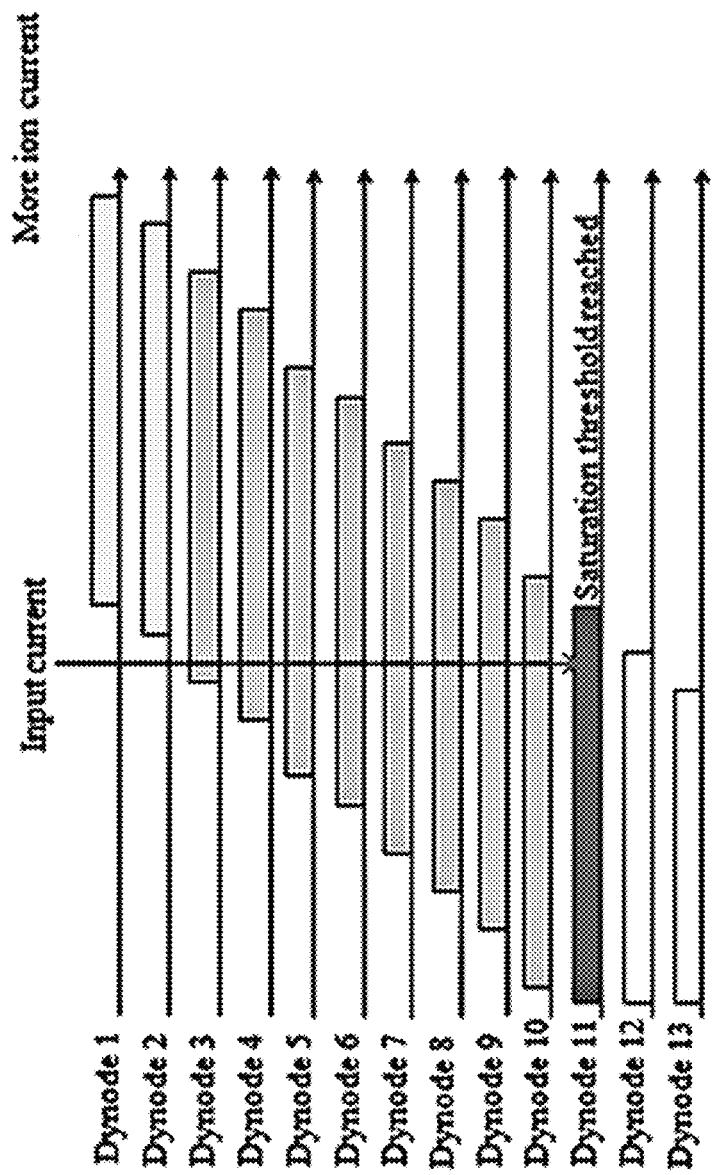
FIG. 13 is a chart illustration showing the dynamic range of various dynodes, in accordance with certain examples.

In certain embodiments to demonstrate a typical output of dynodes, and accounting for the dynamic range at each dynode, an illustration is shown in FIG. 13 of the dynode current for each dynode in a 13 dynode detector relative to an input current. As shown in FIG. 13, the output of the ADC's for Dynodes 1 and 2 is very low and within the electronic noise. As such, these outputs are discarded and not considered in the input calculations. Dynodes 3 to 10 provide ADC outputs within an acceptable window. The signal values of dynodes 3-10 can be averaged to provide a seven-fold accuracy improvement over a single ADC reading. Dynode 11 is measured as being saturated, which results in switching off of dynodes 12 and 13 thus terminating the amplification at dynode 11. The measurement from dynodes 11-13 can also be discarded or otherwise not used in averaging to provide a mean input current that corresponds to the light from a sample or image.

In certain examples and as described herein, measurement of a current at every dynode is not required. Instead, every second, third or fourth dynode could be measured and used. The gain between each stage can be any value, and can be 'calibrated' by comparing its ADC reading to the stage below and above. This found gain can then be used as input current=sum of all stage gains time ADC reading. In some instances, the fixed voltage can be larger than the sum of all dynode stage voltages, and the bottom or last resistor can be used to absorb any extra voltage. In addition, the bottom resistor can also absorb any excess voltage generated by shorting a dynode for termination of signal amplification. In some configurations, it may be desirable to have enough dynodes to compensate for eventual aging. For example, if EM gain decreases over time due to deterioration of surface materials, the saturation point may move further downstream in the dynode set. If the last dynode does not produce an signal-to-noise of 10 to 1 (or other selected signal-to-noise) for single photon event, that response may be indicative that the detector has exceeded its useful life. The expected detector lifetime should be much larger than the current conventional system due to signal termination at a saturated dynode and protection of downstream dynodes.

Figure 14A:
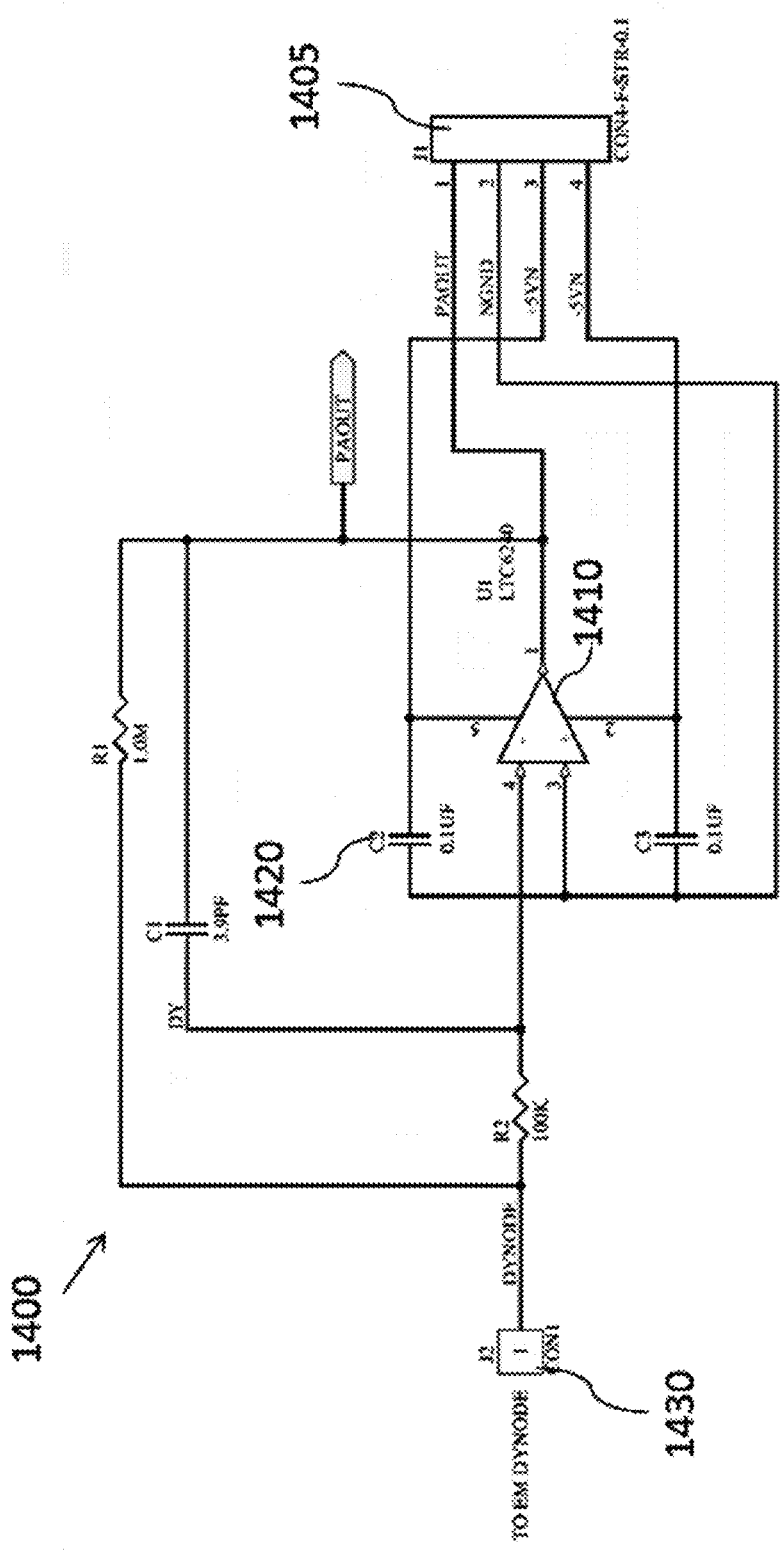
FIG. 14A is a circuit configured to control dynode voltage, in accordance with certain examples.

In certain embodiments, another schematic of a circuit that can be used to measure the signal from a dynode is shown in FIG. 14A. The circuit 1400 generally comprises an amplifier 1410 electrically coupled to a capacitor 1420 and a controller 1405 (or processor if desired). The circuit is electrically coupled to a dynode (not shown) through component 1430. Digital signals can be provided from a processor and used to control the bias voltage of the dynodes. For example, signals from the processor can be used to short out the dynode, to regulate the dynode bias voltage or to otherwise assist in or control the signal amplification mechanism or terminate the signal amplification mechanism.

Figure 14B:
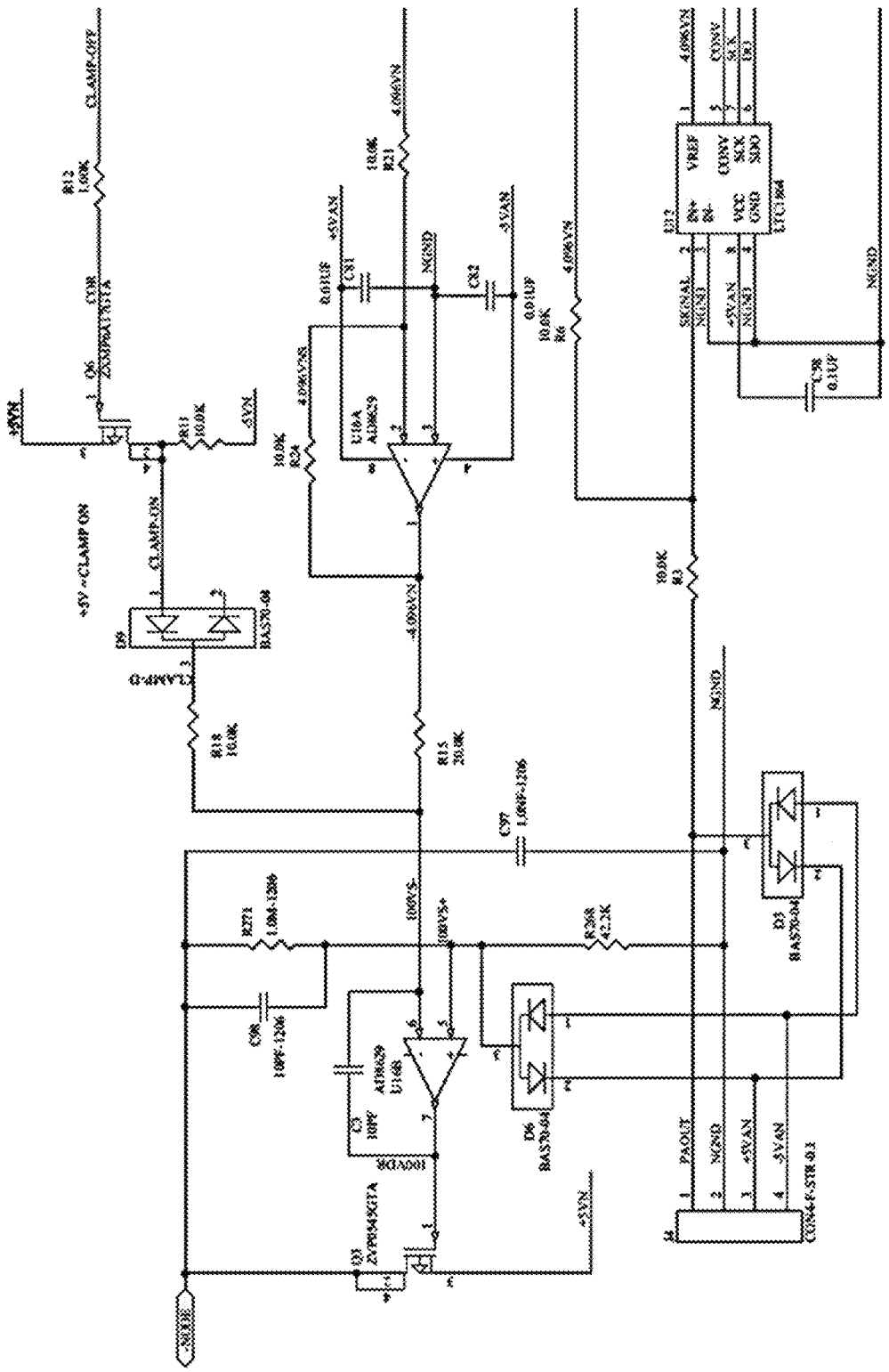
FIGS. 14B and 14C together show a schematic of another circuit configured to control dynode voltage, in accordance with certain configurations.
Figure 14C:
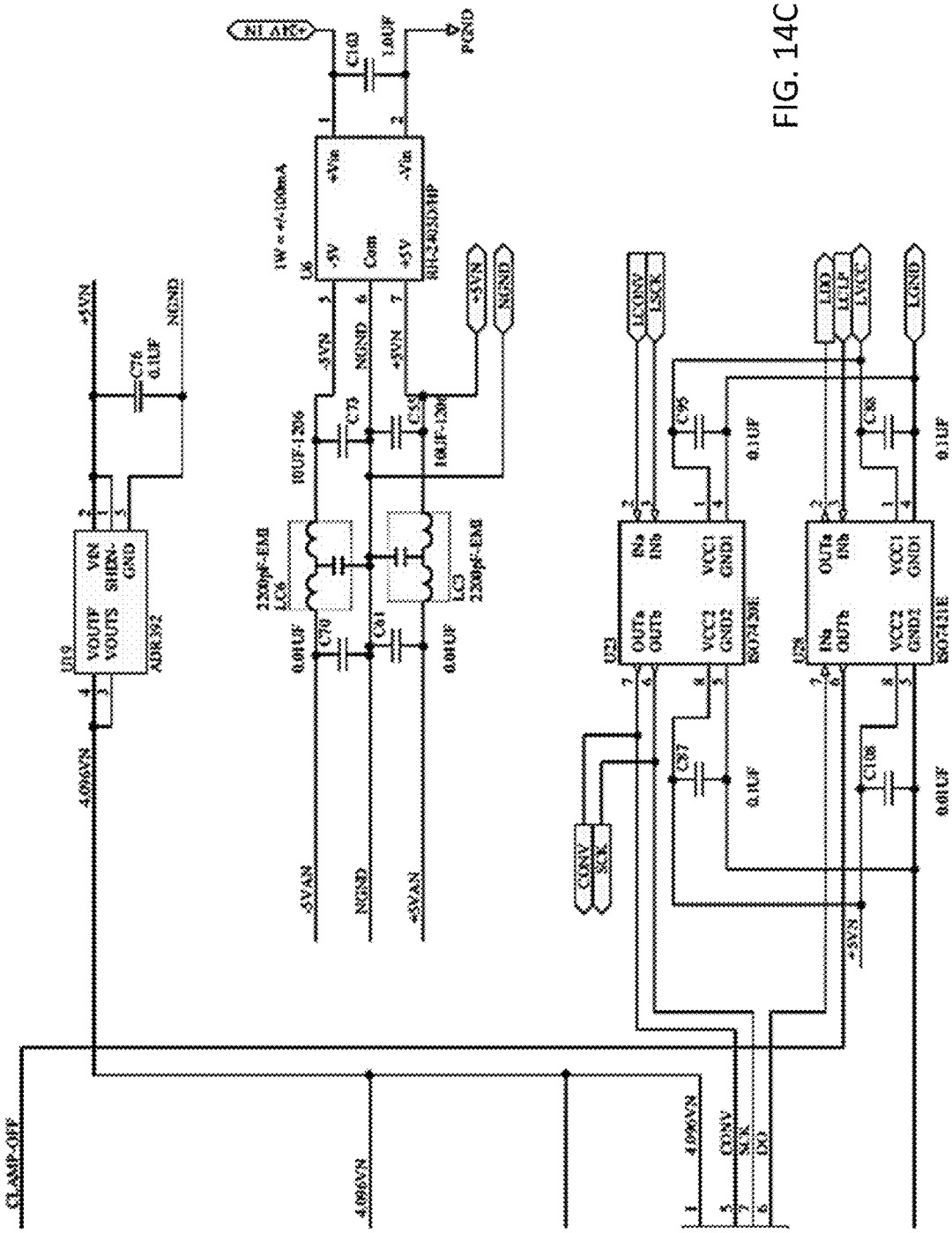

In certain configurations, another schematic of a circuit is shown in FIGS. 14B and 14C. The circuit has been split into two figures to provide for a more user friendly version of the circuit. In the schematic NGND represent a virtual ground. The circuit comprises a DC/DC converter U6 electrically coupled to amplifiers U16A and U16B to provide a voltage to the dynode (labeled as node) of about 101 Volts. A reference voltage of about 4.096 volts is provided from a voltage reference U19 and can be used with the voltage from the DC/DC converter U6, e.g., using the outputs of amplifiers U16A and U16B and amplifier Q3, to provide the 101 Volts to the dynode. Analog signals from the dynode can be measured by an electrometer J4 and provided to an analog-to-digital converter U12. The analog-to-digital converter U12 is electrically coupled to digital isolators U23 and U24, which can isolate the signals from the dynode. The outputted signals from each dynode can be electrically insulated from the signals of other dynodes so that each signal from each dynode is separate from signals from other dynodes, which permits simultaneous measurement of signals from different dynodes. To determine if a saturation signal is present at any one dynode, saturation threshold values can be set in software, and where saturation is detected at the dynode, the voltage can be clamped to stop amplification at the saturated dynode. For example, drive amplifier Q6 and other components of the clamp can be used to short out the dynode, e.g., to place it at virtual ground NGND, which will stop signal amplification at that dynode. Each dynode of the dynode set may comprise a circuit similar to that shown in FIGS. 14B and 14C to provide for independent voltage control, independent voltage clamping (if desired) and to provide separate, electrically isolated signals from each non-shorted dynode to a processor or other input device. In use of the circuit of FIGS. 14B and 14C, dynode signals from dynodes of a dynode set can be measured or monitored. Where a non-saturated signal is detected, amplification may continue using downstream dynodes, e.g., by providing a suitable voltage to the downstream dynodes. When a saturation signal is detected, the dynode where the saturation signal is observed can be grounded to the virtual ground to terminate the amplification at that saturated dynode. Signals from dynodes downstream of the clamped, saturated dynode generally represent noise signals as no amplification occurs at these downstream dynodes. Signals upstream of the saturated dynode and signals above a noise threshold value can be used, e.g., averaged, to determine a mean input current (or mean output current).

In certain embodiments, in implementing the detectors described herein, commercially available components can be selected and assembled as part of larger circuitry on a printed circuit board and/or as a separate board or chip that can be electrically coupled to the dynodes. Certain components can be included within the vacuum of the detectors, whereas other components may remain outside the vacuum tube of the detector. For example, the electrometers, over-current protections and voltage dividers can be placed into the vacuum tube as they do not produce any substantial heat that may increase dark current. To provide an electrical coupling between the components in the vacuum tube and the processor of the system, suitable couplers and cabling, e.g., a flex PCB feed cable that can plug into a suitable coupler, can be implemented.

Figure 15:
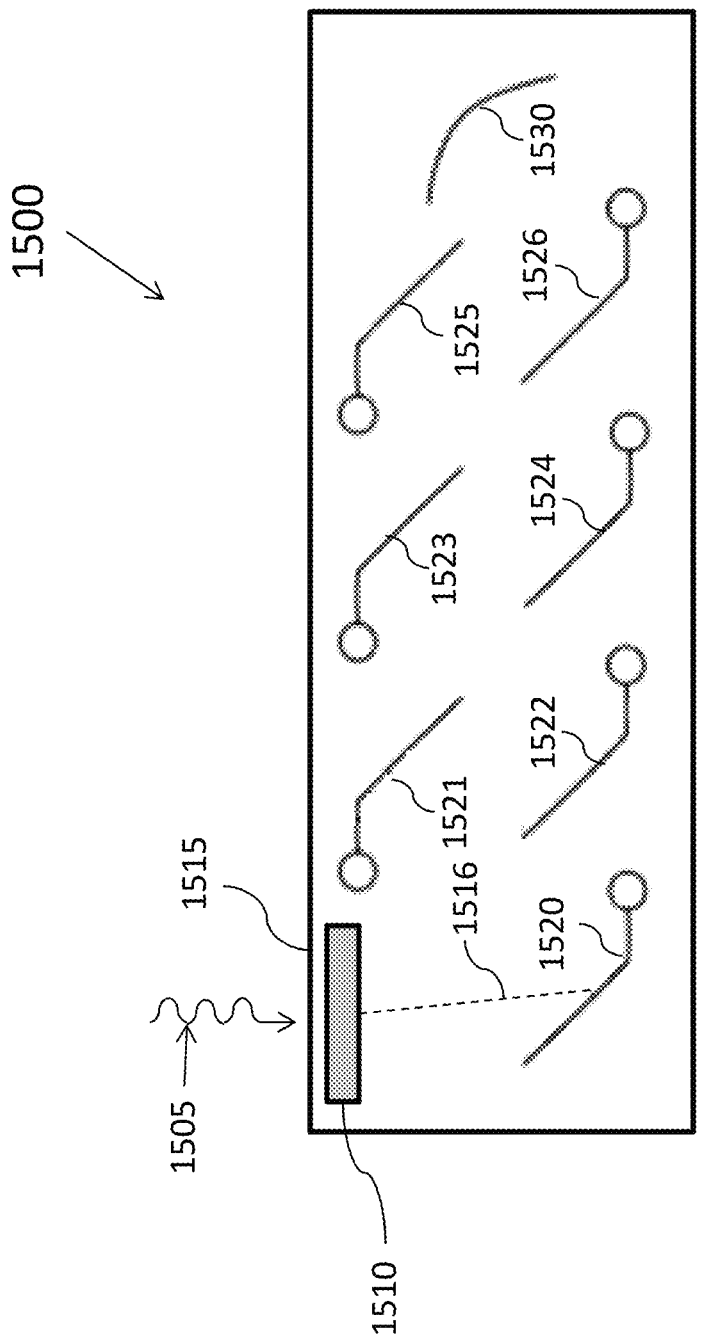
FIG. 15 is an illustration of a side-on detector in accordance with certain examples.

In certain embodiments, the detectors described herein can be configured as either side-on or end-on (also referred to as head-on) devices. Examples of end-on devices are pictorially shown in FIGS. 1-4, for example, where the light is incident on an end of the detector. The housing of an end-on detector would typically be opaque such that the end of the detector near the photocathode is the only portion that receives any substantial light. In other configurations, a side-on detector can be implemented in a similar manner as described herein, e.g., a side-on detector can include a plurality of dynodes with one, two, three or more (or all) of the dynodes electrically coupled to a respective electrometer. One illustration of a side-on detector is shown in FIG. 15. The detector 1500 comprises a photocathode 1510, which is positioned on the side of the device. Light can enter an optical aperture or window 1515 on the side of the detector 1500 and strike the photocathode 1510. As described in reference to the end-on device, the photocathode 1510 can emit electrons (shown as beam 1516) which are amplified by dynodes 1520-1526 within the device 1500 and collected by the anode 1530. Selected dynodes of the side-on detector 1500 can be electrically coupled to a respective electrometer and may include suitable circuitry, e.g., similar to that described in connection with FIGS. 1-12, to permit measurement of input current at the dynodes 1520-1526 and calculation of a mean input current signal, if desired. While an incident photon 1505 is shown in FIG. 15 as being incident at about a ninety degree angle relative to the photocathode 1510, angles other than ninety degrees can also be used. If desired, one or more optical elements, e.g., lenses, can be positioned between the window and the incident light to provide light to the detector at a desired angle.

In certain examples, the exact dynode configuration present in any detector can vary. For example, the dynode arrangement may be of the mesh type, Venetian blind type, linear-focused type, box-and-grind type, circular-cage type, microchannel plate type, metal channel dynode type, electron bombardment type or other suitable configurations. In certain embodiments, the detectors described herein can be produced using suitable materials for the photocathode, the anode and the dynode. For example, the photocathode can include one or more of the following elements or materials: Ag—O—Cs, GaAs:Cs, GaAs:P, InGaAs:Cs, Sb—Cs, Sb—K—Cs, Sb—Rb—Cs, Na—K—Sb—Cs, Cs—Te, Cs—I, InP/InGaAsP, InP/InGaAs, or combinations thereof. The photocathodes can be configured as transmission (semitransparent) type or a reflection (opaque) type. The dynodes of the detectors may include one or more of carbon (diamond), AgMg, CuBe, NiAl, $Al_2O_3$, BeO, MgO, SbKCs, $Cs_3Sb$, GaP:Cs or any one or more of the materials described in connection with the photocathode. As noted herein, the exact material selected for use in the dynodes has a direct effect on the gain. One or more of these materials can be present on a surface at a suitable angle to permit the surface to function as a dynode. The anode may include suitable materials to permit collection of any electrons, e.g., one or more conductive materials. The windows or apertures of the devices that are adjacent to the photocathode may be configured as optical filters, e.g., filters that permit only certain wavelengths to pass, or may be optically transparent. Typical glass materials used in the windows include, but are not limited to, borosilicate glass, low potassium glass, silica glass, UV glass, Schott glass, magnesium fluoride or other suitable glass materials. In other embodiments, crystals or sapphire can be present between the housing of the detector (or in the housing of the detector) and the photocathode and can function as optical apertures between the incident light and the photocathode.

In certain examples, the detectors described herein can be used in many different applications including, but not limited to, medical and chemical instrumentation, microscopes, cameras, telescopes, microchannel plate detectors, CT scanners, PET scanners, X-ray detectors, image intensifiers, vision devices, e.g., night vision devices, radiation detectors. Illustrations of these and other detectors are described in more detail below.

Figure 16:
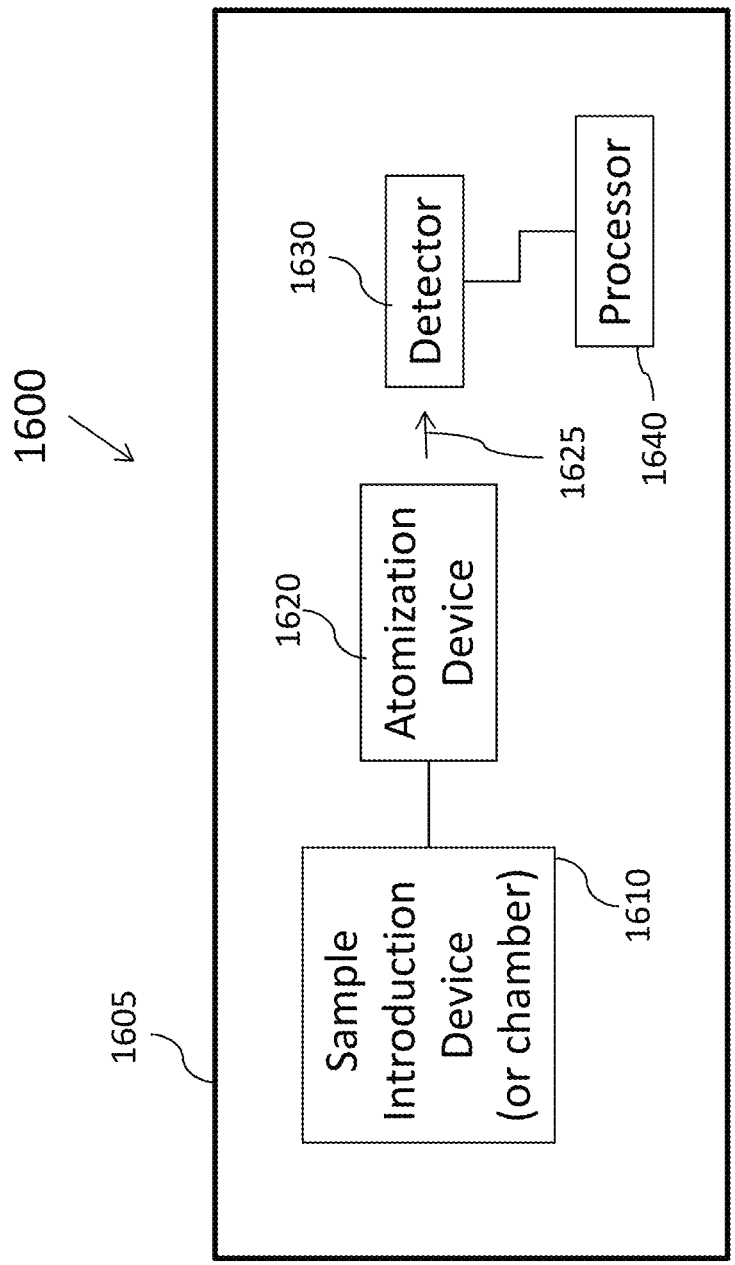
FIG. 16 is an example of a device for optical emission spectroscopy, in accordance with certain examples.

In certain embodiments, the detectors and associated circuitry described herein can be used in medical and chemical instrumentation. For example, the detectors can be used to detect light in many applications including, but not limited to, luminescence, chemiluminescence, fluorescence, phosphorescence, Raman spectroscopy, bioluminescence, environmental analysis, gene chip scanning (or bar code scanning), radiation counters, surface inspection, e.g., laser scanning surface inspection, flow cytometry, astronomical instrumentation, industrial equipment and materials inspection and other applications. Referring to FIG. 16, a device for optical emission spectroscopy (OES) is shown. As chemical species are atomized and/or ionized, the outermost electrons may undergo transitions which may emit light (potentially including non-visible light). For example, when an electron of an atom is in an excited state, the electron may emit energy in the form of light as it decays to a lower energy state. Suitable wavelengths for monitoring optical emission from excited atoms and ions will be readily selected by the person of ordinary skill in the art, given the benefit of this disclosure. The exact wavelength of optical emission may be red-shifted or blue-shifted depending on the state of the species, e.g. atom, ion, etc., and depending on the difference in energy levels of the decaying electron transition, as known in the art. The OES device 1600 includes a housing 1605, a sample introduction device 1610 (or sample chamber where a sample resides), an atomization device 1620, e.g., a flame, plasma, arc or other devices (which can produce atoms, ions or both), and a detector 1630. The sample introduction device 1610 (or chamber) may vary depending on the nature of the sample. In certain examples, the sample introduction device 1610 may be a nebulizer that is configured to aerosolize liquid sample for introduction into the atomization device 1620. In other examples, the sample introduction device 1610 may be an injector configured to receive sample that may be directly injected or introduced into the atomization device 1620. Other suitable devices and methods for introducing samples will be readily selected by the person of ordinary skill in the art, given the benefit of this disclosure. The detector 1630 may take numerous forms and may be any suitable device that may detect optical emissions, such as optical emission 1625. For example, the detection device 1630 may include suitable optics, such as lenses, mirrors, prisms, windows, band-pass filters, etc. The detection device 1630 may also include gratings, such as echelle gratings, to provide a multi-channel OES device. Gratings such as echelle gratings may allow for simultaneous detection of multiple emission wavelengths. The gratings may be positioned within a monochromator or other suitable device for selection of one or more particular wavelengths to monitor. Within the detector 1630, a photocathode, anode and a plurality of dynodes can be present as described herein in reference to FIGS. 1-12, for example. The unique ability of the detectors described herein to terminate signal amplification at a saturated dynode permits operation of the detector 1630 without having to alter the entry slit width between different samples. For example, in a typical instrument for OES, the entry and exit slit width may be changed to optimize the signal-to-noise ratio for a particular sample without overloading the detector. The photocathode of the detector would commonly be optically coupled to the exit slit of the monochromator. Where one or more of the detectors described herein are used, the exit slit (and the entrance slit if desired) can be fixed, e.g., at a maximum opening, to permit a maximum amount of light to enter the monochromator. If saturation occurs at certain dynodes because of excessive light, then signal amplification can be terminated at a saturated dynode (or downstream of the saturated dynode). The input currents for non-saturated dynodes can then be used to determine a mean input current signal representative of the light emission. For quantitative measurements, conventional standard curves may be performed to determine an accurate amount of the sample. In other examples, the OES device 1600 may be configured to implement Fourier transforms to provide simultaneous detection of multiple emission wavelengths. The detection device may be configured to monitor emission wavelengths over a large wavelength range including, but not limited to, ultraviolet, visible, near and far infrared, etc. The OES device 1600 may further include suitable electronics such as a processor 1640 and/or computer and suitable circuitry to provide a desired signal and/or for data acquisition or display. Suitable additional devices and circuitry are known in the art and may be found, for example, on commercially available OES devices such as Optima 2100DV series and Optima 5000 DV series OES devices commercially available from PerkinElmer Health Sciences, Inc. The OES device 1600 may further include autosamplers, such as AS90 and AS93 autosamplers commercially available from PerkinElmer Health Sciences, Inc. or similar devices available from other suppliers.

Figure 17:
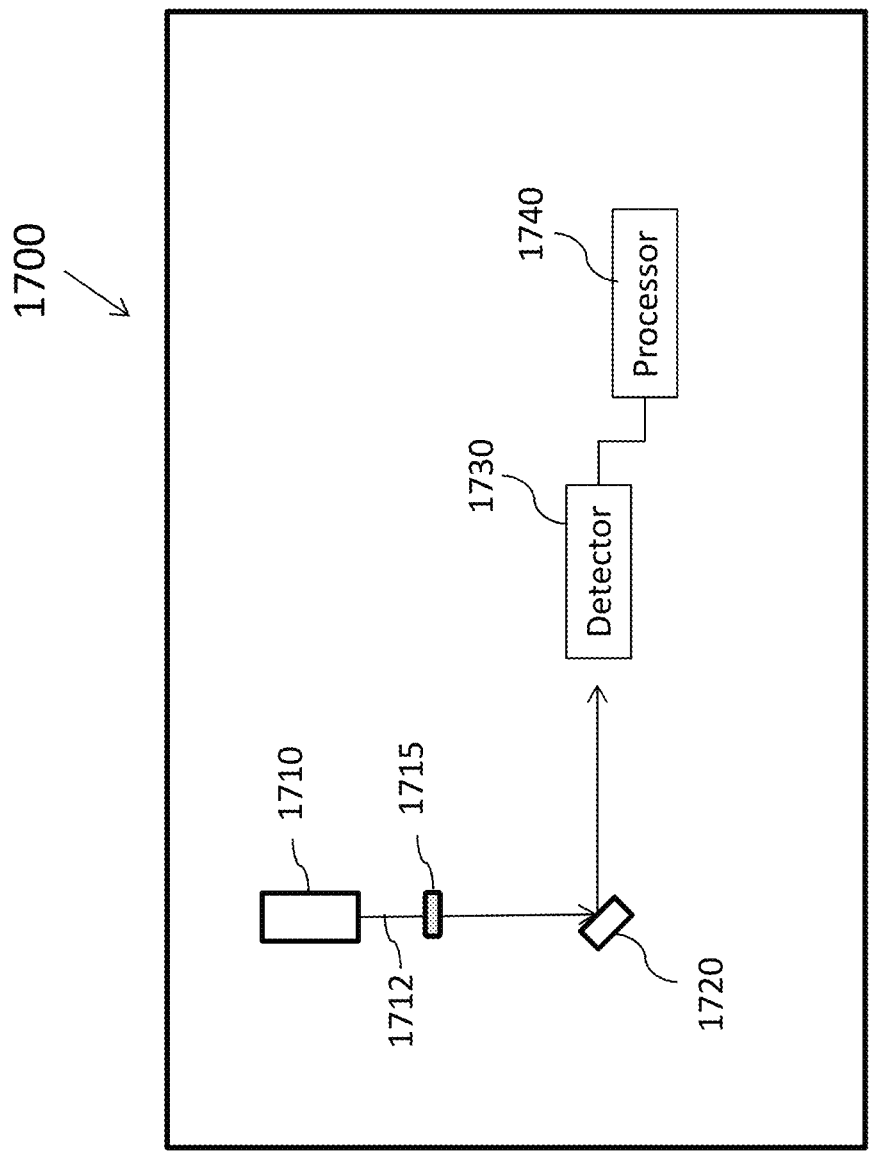
FIG. 17 is an example of a device for measuring fluorescence or phosphorescence, in accordance with certain examples.

In accordance with certain examples, a device for fluorescence spectroscopy (FLS), phosphorescence spectroscopy (PHS) or Raman spectroscopy is shown in FIG. 17. Device 1700 includes a light source 1710, a sample chamber 1720, and a detector 1730. The detector 1730 may be any one or more of the detectors described herein, e.g., a detector comprising dynodes coupled to respective electrometers. The detector 1730 may be positioned about ninety degrees from incident light 1712 from the light source 1710 to minimize the amount of light from the light source 1710 that arrives at the detector 1730. Fluorescence, phosphorescence and Raman emissions may occur in 360 degrees so the positioning of the detector 1730 to collect light emissions is not critical. An optical chopper 1715 may be used where it is advantageous to pulse the light source 1710. Where the light source is a pulsed laser, the chopper 1715 may be omitted. The light source 1710 excites one or more electrons into an excited state, e.g., into an excited singlet state, and the excited atom may emit photons as it decays back to a ground state. Where the excited atom decays from an excited singlet state to the ground state with resultant emission of light, fluorescence emission is said to occur, and the maximum emission signal is typically red-shifted when compared to the wavelength of the excitation source. Where the excited atom decays from an excited triplet state to the ground state with resultant emission of light, phosphorescence emission is said to occur, and the maximum emission wavelength of phosphorescence is typically red-shifted when compared to the fluorescence maximum emission wavelength. For Raman spectroscopy, scattered radiation may be monitored, and the Stokes or anti-Stokes lines may be monitored to provide detection of the sample. The emission signal may be collected using the detector 1730, which may be, for example, a monochromator with suitable optics such as prisms, echelle gratings and the like, that is optically coupled to a device comprising dynodes electrically coupled to respective electrometers (or other structures, including surfaces that can emit secondary electrons, that is coupled to an electrometer). Where one or more of the detectors described herein are used, the exit slit (and the entrance slit if desired) can be fixed, e.g., at a maximum opening, to permit a maximum amount of light to enter the monochromator. If saturation occurs at certain dynodes because of excessive light, then signal amplification can be terminated at a saturated dynode (or downstream of the saturated dynode). The input currents for non-saturated dynodes can then be used to determine a mean input current signal representative of the emission. For quantitative measurements, conventional standard curves may be performed to determine an accurate amount of the sample. The device 1700 may further include suitable electronics such as a processor 1740 and/or computer and suitable circuitry to provide a desired signal and/or for data acquisition or display or to calculate the mean input currents from the various dynode measurements.

In certain embodiments where fluorescence measurements are performed, the light source can be positioned below a sample tray, e.g., a microtiter or microwell tray, that comprises samples which can be excited and may emit light. Each well or tray can be optically coupled to a respective channel comprising dynodes and electrometers to permit high throughput signal measurements from all wells (or selected wells) at the same time. For example, a detector array can be provided where each member of an array can be separately optically coupled to an individual well, e.g., each array member can include dynodes and respective electrometers than can function independently of other array members comprising dynodes and respective electrometers. The array member can receive light and amplify the signal as described herein. The detector can be configured such that each member of the array operates independently of the other members. For example, one member of the array may measure large light signals causing termination of the signal at dynode 8 of a 20 dynode detector. Another member of the array may measure smaller light signals such that signal amplification is not terminated until dynode 18 of the 20 dynode detector. The gain of separate array members may be substantially equal to facilitate simpler design, and the electrometers, amplifiers and/or signal processors of each array member can be monitored and used to calculate a mean input signal for each array member and hence each sample well of the microwell plate.

In certain examples, the detectors described herein can be used in microscopes or other devices that receive light and permit viewing of an object under the device. For example, one or more of the detectors described herein can be used in confocal microscopy devices. For example, fluorescence emission from a sample can be directed through an aperture positioned near the image plane to exclude light from fluorescent structures located away from an objective focal plane of the microscope. This positioning reduces the amount of light available for image formation and provides low light levels. Signal amplification of the low light levels can be performed to provide an image. The fast response times and high sensitivities of the detectors described herein permit their use in microscopy applications. The detector can be located in a scan head of the microscope or an external housing. As described herein, the voltage can be operated at a maximum dynode voltage to provide a maximum gain. Offset values can also be used to adjust sensitivity if desired. For example, offset can be used to provide a positive or negative voltage to the output signal, and can be adjusted so that the lowest signals are near the detector threshold. In other examples, the offset can be omitted and input currents within a desired window, e.g., within a window between a noise level and a saturation level, can be used in image construction. After the signal has been processed by an analog-to-digital converter, it can be stored in a frame buffer and displayed in a series of gray levels ranging from black (no signal) to white (saturation). The increased dynamic range provided by the detectors described herein can permit display of more than a conventional number of gray levels. For example, in a typical confocal microscope with a photomultiplier, the photomultiplier has a dynamic range of 10 or 12 bits and is capable of displaying 1024 or 4096 gray levels, respectively. Accompanying image files also have the same number of gray levels. By using a detector with increased dynamic range, more contrast may be achieved if desired. If desired, the microscope can include more than a single detector, e.g., may include three detectors with one for a red channel, one for a green channel and one for a blue channel, and the resulting images can be merged into a single image to provide a representation of the actual color of the specimen under the microscope.

Figure 18:
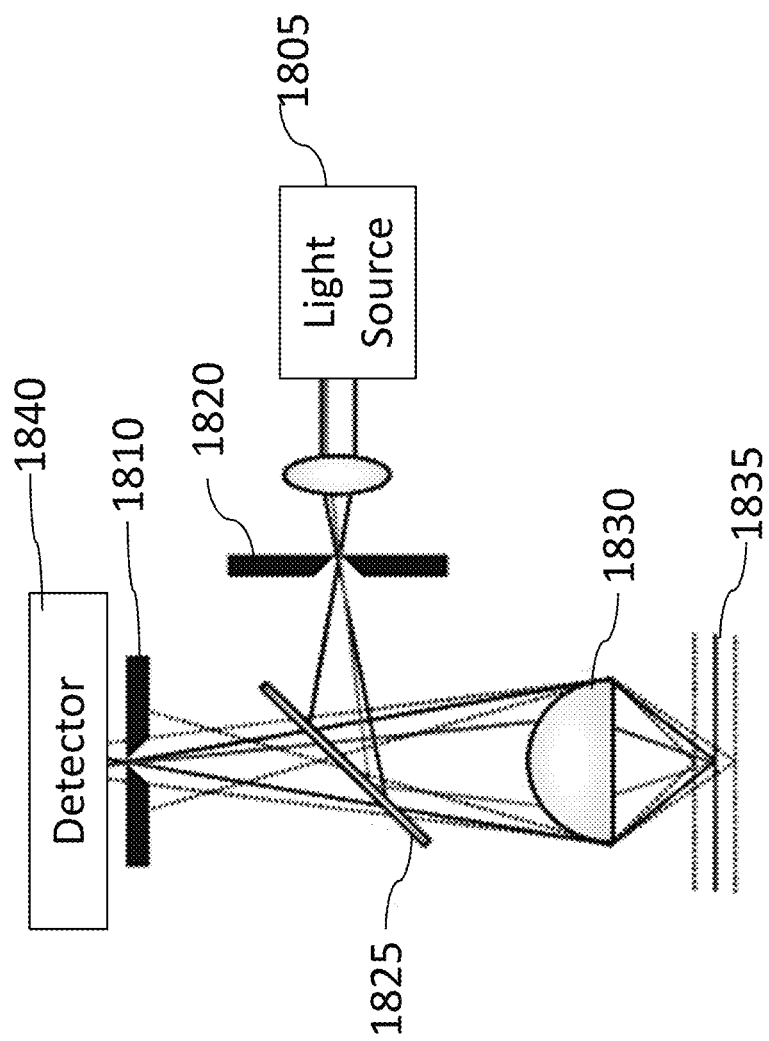
FIG. 18 is a schematic of a confocal microscope, in accordance with certain examples.

Referring to FIG. 18, a schematic of a confocal microscope is shown. The microscope 1800 comprises components 1810 and 1820 that provide pinholes, which are generally equidistant from a specimen to be imaged. Light from a light source 1805 passes through the pinhole in component 1820 and is split by a beam splitter 1825. The light source 1805 can be any suitable light source including arc lamps, lasers or other light sources commonly used in microscopy and spectroscopy. The beam splitter 1825 reflects light to an objective 1830 and a specimen 1835, which is shown as a horizontal line for illustration purposes. The properties of the beam splitter 1825 are typically selected so that light emitted from the specimen (which typically has a wavelength higher than the wavelength of light from the light source 1805) can pass through the beam splitter 1825 and to the component 1810 with the second pinhole. Light passes through the pinhole in component 1810 and is provided to the detector 1840, which may be any one or more of the detectors described herein, e.g., a detector comprising dynodes any one or more of which is electrically coupled to a respective electrometer. The passing of the light through pinhole of the component 1810 provides light to the detector 1840 in a narrow focal plane. It will be recognized by the person of ordinary skill in the art, given the benefit of this disclosure, that other components may be substituted into the device of FIG. 18. For example, an acousto-optical device or other optical element can replace the beam splitter. The microscope may also include suitable lenses, gratings or other optical elements. In some embodiments, the microscope can be configured as a laser scanning confocal microscope.

Figure 19:
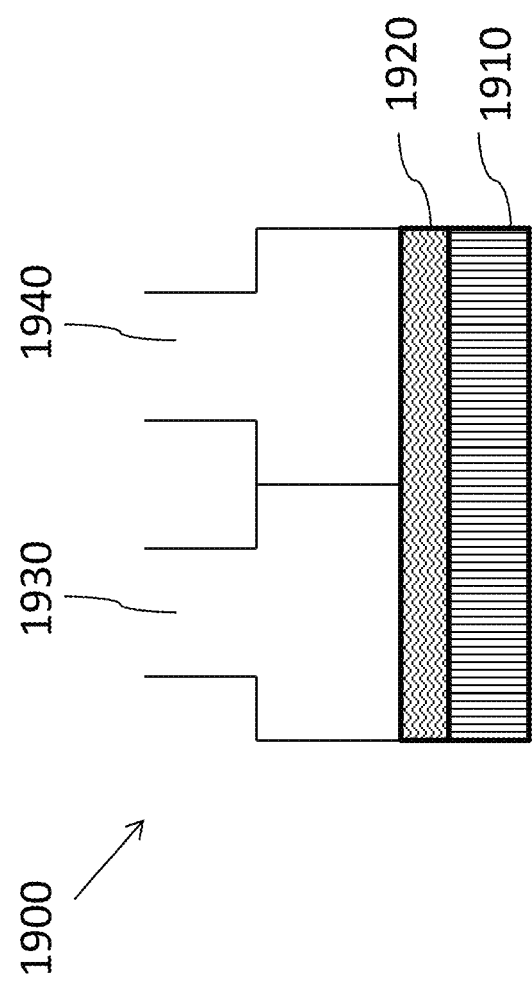
FIG. 19 is a schematic of a scintillation camera, in accordance with certain examples.

In certain embodiments, the detectors described herein can be used in a camera to provide an image, e.g., a digital image or an X-ray image, that can be displayed or stored in memory of the camera. In some embodiments, the camera may be configured as a scintillation camera to detect gamma radiation emitting from radioisotopes. Scintillation cameras are commonly used, for example, in medical imaging to view images after a contrast agent comprising one or more radionuclides has been introduced into a subject, e.g., a human or non-human mammal, or a structure. The gamma camera generally comprises one or more crystal planes optically coupled to an array of detectors, e.g., a crystal plane optically coupled to 6 detectors (or other number of detectors). In some examples, one or more of the detectors of the array may comprise any one of the detectors described herein, e.g., a detector comprising dynodes electrically coupled to respective electrometers. The crystal/detector assembly is typically positioned in a scan head that can be moved over or around the object to receive gamma emissions through a gantry, arm or other positioning means, e.g., an arm coupled to one or more motors. A processor, e.g., one present in a computer system, functions to control the position and movement of the scan head and can receive input currents, calculate a mean input current and use such calculated values to construct and/or store images representative of the received gamma emissions. The positioning of the detectors can provide spatial resolution as each detector is positioned at a different angle relative to incident emission. As such, saturation of any one detector may occur with other detectors remaining unsaturated or becoming saturated at a different dynode. If desired, the processor can determine whether or not a dynode is saturated at any one detector and then subsequently short other non-saturated dynodes of other detectors at the same dynode. For example, if detector 1 of a six detector array is saturated at dynode 12, then signal amplification at other detectors can be terminated at dynode 12 to provide relative input currents, which can be used to provide spatial resolution and/or enhanced contrast for the images. By terminating the signal amplification at the same dynodes of different detectors, the use of weighting factors can be omitted and images can be constructed in a simpler manner. Alternatively, weighting factors can be applied based on where saturation occurs at each detector to reconstruct an image. For illustration purposes, one example of a scintillation or gamma camera is shown in FIG. 19. The camera 1900 includes a collimator 1910, e.g., a lead sheet collimator, optically coupled to a scintillator crystal 1920. Two detectors 1930 and 1940 are shown as being optically coupled to the scintillation crystal 1920. Each of the detectors 1930, 1940 may be configured as described herein, e.g., may include dynodes electrically coupled to respective electrometers. If desired, the detectors 1930, 1940 may be configured to be the same or may be different. The detectors 1930, 1940 are each electrically coupled to a processor (not shown) that can receive signals from the detectors for use in constructing an image. The camera 1900 can be used to create 2D images, can be used in SPECT (single photon emission computed tomography) imaging, PET (positron emission tomography) imaging or other imaging systems where one or more materials emits photons.

In some instances, the detectors described herein can be used in satellite instrumentation. For example, meteorological satellites, surveillance satellites or other satellites that can provide images of the earth (or structures, weather systems or other devices on the earth) can include one or more of the detectors described herein. In some embodiments, a satellite may include one or more of the detectors described herein and suitable circuitry or components to capture images representative of the light received by the detectors. The captured images can be stored in memory and/or transmitted to a remote site by way of radio waves or other waves sent from a transmitter on the satellite to a receiver at a remote location.

In some embodiments, the detectors described herein can be used in a telescope. For example, a refracting telescope can include a detector optically coupled to the objective lens and any focusing lens of the telescope. The detector (or detector array) can include dynodes electrically coupled to respective electrometers to measure light signals received by the objective lens of the telescope. The detector may be electrically coupled to a computer system to store images or may be wirelessly coupled to a remote computer system, e.g., in the case where the telescope is positioned on a satellite or otherwise is orbiting the earth, to receive the images.

In certain embodiments, certain components of the detectors described herein can be used in a microchannel plate to amplify a signal. The microchannel plate functions similar to the dynode stages of the detectors described herein except the many separate channels which are present provide spatial resolution in addition to amplification. The exact configuration of the microchannel plate can vary, and in some examples, the microchannel plate (MCP) can take the form of a Chevron MCP, a Z stack MCP or other suitable MCPs. Illustrative MCPs are described in more detail below.

Figure 20B:
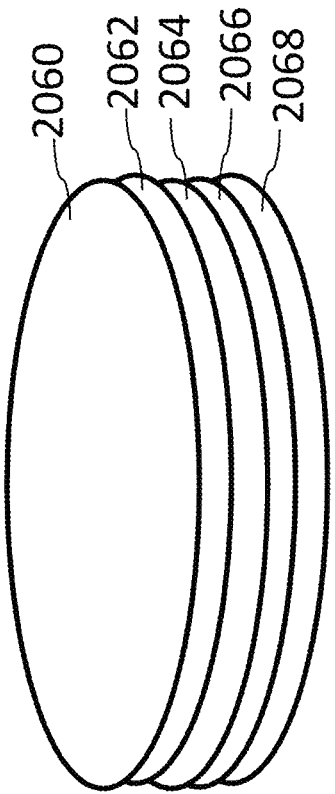
FIG. 20B is an illustration of stacked microchannel plates each of which can function as a dynode, in accordance with certain configurations.
Figure 20A:
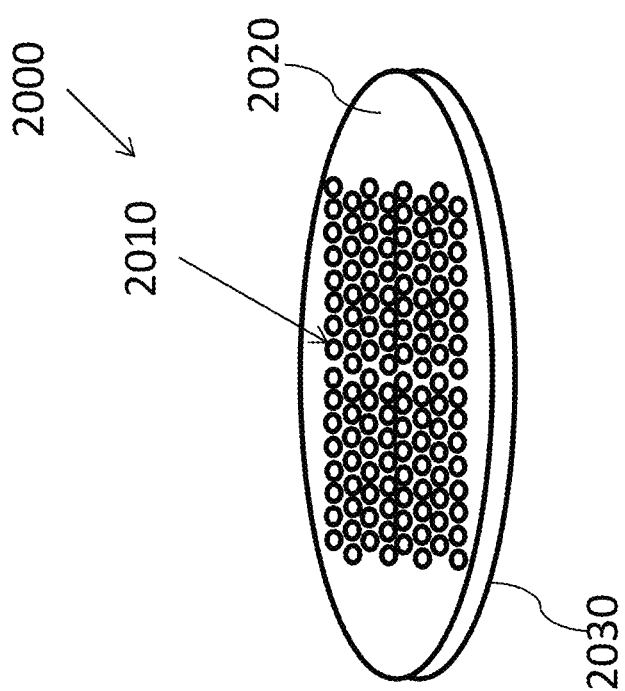
FIG. 20A is an illustration of a microchannel plate, in accordance with certain examples.

In certain embodiments and referring to FIG. 20A, a schematic of a microchannel plate 2000 is shown comprising a plurality of electron multiplier channels 2010 oriented parallel to each other. The exact number of channels in the plate 2000 can vary, e.g., 100-200 or more. The MCP can include electrodes 2020 and 2030 on each surface of the plate to provide a bias voltage from one side to the other to side of the plate. The walls of each of the channels 2010 can include a material which can emit secondary electrons that can be amplified down the channel. Each channel (or a selected number of channels) can be electrically coupled to a respective electrometer to measure the input current from each channel. For example, non-saturated channels can be used to construct an image and saturated channels can be shorted out to protect the channel or otherwise not used to provide an image. If desired, the electrodes 2020 and 2030 can be configured as an electrode array with an electrode corresponding to each channel to permit independent control of the voltage provided to each channel. In addition, in some configurations each channel can be electrically isolated from other channels to provide a plurality of continuous but separate dynodes in the plate An external voltage divider can be used to apply a bias voltage to accelerate electrons from one side of the device to the other. In certain embodiments, the MCP's can be configured as a chevron (v-like shape) MCP. In one configuration, a chevron MCP includes two microchannel plates where the channels are rotated about ninety degrees from each other. Each channel of the chevron MCP can be electrically coupled to a respective electrometer or a selected number of channels can be electrically coupled to an electrometer. In other embodiments, the MCP can be configured as a Z stack MCP, with three microchannel plate aligned in a shape that resembles a Z. The Z stack MCP may have increased gain compared to a single MCP.

In some instances, a plurality of microchannel plates may be stacked and configured such that each plate functions similar to a dynode. One illustration is shown in FIG. 20B where plates 2060, 2062, 2064, 2066 and 2068 are stacked together. While not shown, one, two, three, four or all five of the plates may be electrically coupled to a respective electrometer. The voltages applied to each plate may be controlled using circuits and configurations similar to those described in reference herein to the dynodes. In some instances, stacked MCPs can be used as, or in, X-ray detectors, and by controlling the voltage applied to individual plates, the gain of the detector can be automatically adjusted for each image to provide more clear images.

In certain examples, the detectors described herein can be used in X-ray detectors such as those used to image humans or used to image inanimate objects, e.g., to image baggage at screening centers. In particular, one or more detectors can be optically coupled to a scintillator plate or crystal that resides underneath baggage and can receive X-rays from an X-ray source over the baggage to image items within baggage. Similar to X-ray detectors, the detectors described herein can be used in applications such as neutron activated techniques, which are used, for example, in explosives detection.

Figure 21:
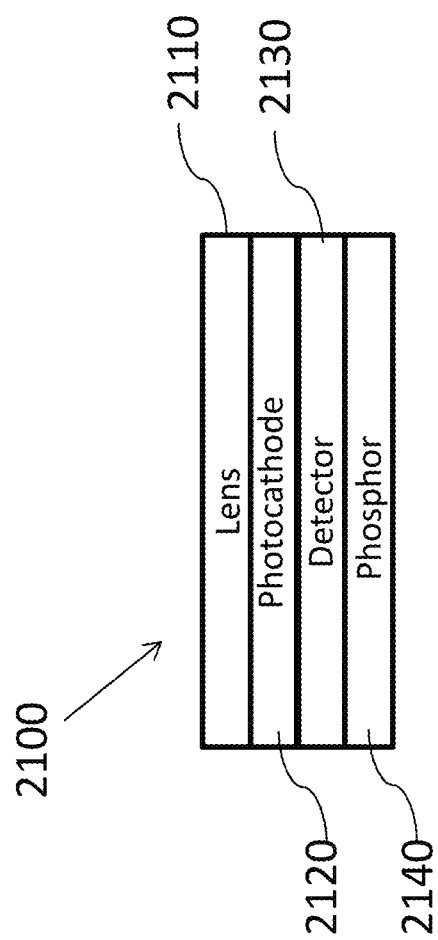
FIG. 21 is schematic of an image intensifier, in accordance with certain examples.

In certain embodiments, the detectors described herein may be used in image intensification devices such as those commonly present in night vision devices. For example, the detectors described herein can be optically coupled to a phosphor screen to amplify light, e.g., infrared light, received by a photocathode, and provide the amplified signal to the phosphor screen to recreate an image. For illustration purposes, the components of an exemplary image intensifier are shown in FIG. 21. The intensifier 2100 comprises a lens 2110 optically coupled to a photocathode 2120. The photocathode 2120 receives light from the lens 2110 and converts the light into electrons, which are provided to the detector 2130. As described herein, the detector 2130 can include a plurality of dynodes where one or more dynodes are electrically coupled to an electrometer. If desired, a detector array can be present to provide spatial resolution. In some embodiments, the detector 2130 can include a microchannel plate comprising electrometers electrically coupled to respective channels to amplify the light. If saturation at a particular channel is detected, the voltage for the particular channel may be controlled so that the signal from that channel is terminated and does not overload the phosphor screen 2140. The amplified signals are provided from the detector 2130 in the form of electrons, which strike the phosphor screen 2140. The provided electrons are incident on the phosphor screen in the same general position in which they arrive at the detector 2130. The incident electrons cause excitation and emission of the phosphors of the phosphor screen to recreate the light image that was incident on the lens 2110. The device 2100 can include a processor and suitable circuitry to monitor incident light signals and ensure the detector 2130 does not become saturated. The processor can also be used to provide an image to a display. In some examples, an ocular lens may be present to magnify and/or focus any image for viewing by a user.

Figure 22:
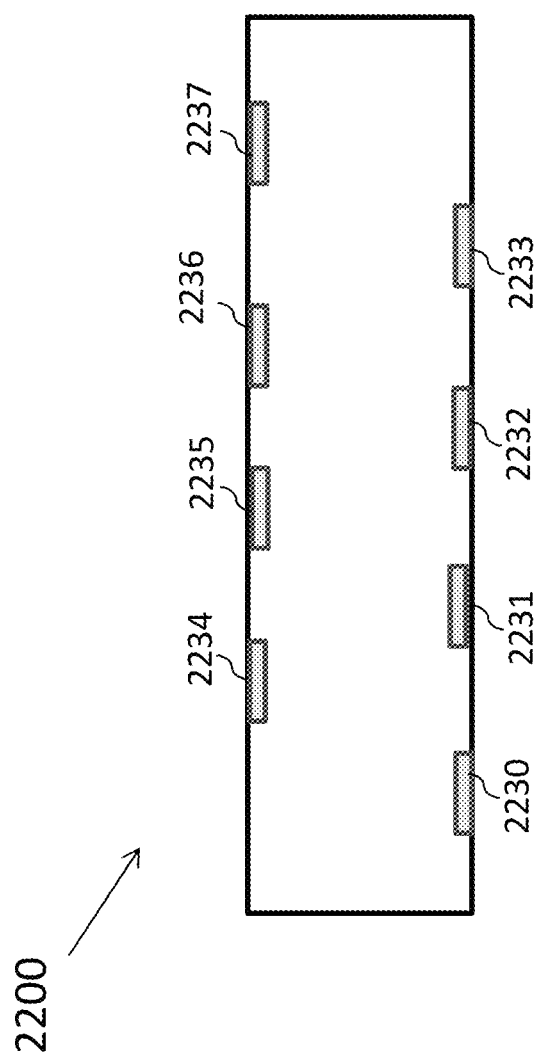
FIG. 22 is a simplified illustration of a continuous optical detector, in accordance with certain configurations.

In certain configurations, the circuits and components described herein can be used with a continuous optical detector. For example and referring to FIG. 22, a continuous electron optical detector 2200 is shown that comprises surfaces 2230-2237. Surface 2230 is the first surface that can receive incident light and provide ejected electrons to surface 2234. Surface 2234 provides ejected electrons to surface 2232 (or 2231). This amplification can continue using the other surfaces. Each surface can be electrically coupled to a respective electrometer similar to the dynode/electrometer pairs described herein. Signals from each surface may also be electrically isolated from signals from other surfaces. Where saturation is detected at a surface, the surface can be shorted out to protect downstream surfaces of the detector 2200. Signals from the various surfaces can be used to calculate currents, e.g., input current or output currents.

In certain embodiments, the detectors described herein can be configured to simultaneously detect an input current signal at each dynode of a plurality of dynodes of a photomultiplier configured to receive photons, and average the detected input current signals at each dynode that comprises a measured current input signal above a noise current input signal and below a saturation current input signal to determine a mean input current. In other embodiments, the detector can terminate signal amplification at a dynode where a saturation current is measured. In some examples, the detector can alter the voltage at a downstream dynode adjacent to the dynode where the saturation current is measured to terminate the signal amplification. In certain instances, the detector can determine the mean input current by calculating the input currents at all dynodes and discarding calculated input currents below the noise current input signal and above the saturation current input signal, scaling each non-discarded calculated input current by its respective gain, and averaging the scaled input currents to determine the mean input current. In some embodiments, the detector can measure the photons without adjusting the gain. In further embodiments, the detector can measure optical emission from a plurality of samples comprising different concentrations without adjusting the gain of the photomultiplier. In other embodiments, the detector can measure optical emission from a plurality of samples comprising different concentrations without adjusting entry slit width of the photomultiplier. In some instances, the detector can calculate sample concentration from the determined mean input current.

In certain examples, the detectors described herein can simultaneously detect an input current signal of at least two internal dynodes of a photomultiplier configured to receive photons, and average the detected input current signals at each of the at least two internal dynodes comprising a measured current input signal above a noise current input signal and below a saturation current input signal to determine a mean input current. In other examples, the detector can terminate signal amplification at a dynode where a saturation current is measured. In some embodiments, the detector can comprise simultaneously detecting an input current signal at every other internal dynode of the plurality of dynodes. In some examples, simultaneously detecting an input current signal at every third internal dynode of the plurality of dynodes. In certain embodiments, the detector can comprise terminating signal amplification at a dynode where a saturation current is measured. In further embodiments, the detector can comprise providing a floating voltage at each detected dynode of the plurality of dynodes. In some instances, the detector can comprise controlling the voltage at each dynode independently of voltage at the other dynodes of the plurality of dynodes. In certain embodiments, the detector can measure optical emission from a plurality of samples comprising different concentrations without adjusting the gain of the photomultiplier. In other embodiments, the detector can measure optical emission from a plurality of samples comprising different concentrations without adjusting entry slit width of the photomultiplier. The detector can also calculate sample concentration from the determined mean input current. In some instances, the detector can determine the mean input current by calculating the input currents at selected dynodes and discarding calculated input currents below the noise current input signal and above the saturation current input signal, and scaling each non-discarded calculated input current by its respective gain and averaging the scaled input currents to determine the mean input current.

In some embodiments, the detectors described herein can separately control a bias voltage in each dynode of an optical detector comprising a photocathode, an anode and a plurality of dynodes between the photocathode and the anode to measure the photons. In other embodiments, the separately controlling the bias voltage in each dynode comprises regulating the dynode voltage to be substantially constant with increasing electron current. In some instances, the detector can calculate input currents at selected dynodes of the plurality of dynodes, discard calculated input currents below a noise current input level and above the saturation current input level, scale each non-discarded calculated input current by its respective gain, and average the scaled input currents to determine a mean input current.

In certain embodiments, the detectors described herein can amplify a light signal from the sample by independently measuring an input current at each of a plurality of dynodes in an optical detector comprising a photocathode, an anode and the plurality of dynodes between the photocathode and the anode. In some examples, the detector can calculate input currents at each dynode of the plurality of dynodes, discard calculated input currents below a noise current input level and above the saturation current input level, scale each non-discarded calculated input current by its respective gain, and averaging the scaled input currents to determine a mean input current.

In some embodiments, the detectors described herein can amplify a light signal from the sample by independently measuring an input current at two or more of a plurality of dynodes in an optical detector comprising a photocathode, an anode and the plurality of dynodes between the photocathode and the anode. In certain instances, the detector can calculate input currents at each of the two or more dynodes of the plurality of dynodes, discard calculated input currents below a noise current input level and above the saturation current input level, scale each non-discarded calculated input current by its respective gain, and average the scaled input currents to determine a mean input current. In certain examples, the detectors can measure input currents from every other dynode of the plurality of dynodes.

In certain embodiments, the detectors described herein may be part of a system comprising a photocathode, an anode, a plurality of dynodes between the photocathode and the anode, at least one electrometer electrically coupled to one of the plurality of dynodes and a processor electrically coupled to the at least one electrometer, the processor configured to determine a mean input current from input current measurements measured by the electrometer. In some embodiments, the processor can be configured to determine the mean input current by calculating input currents at the at least one dynode of the plurality of dynodes, discard calculated input currents below a noise current input level and above the saturation current input level, scale each non-discarded calculated input current by its respective gain, and average the scaled input currents to determine a mean input current. If desired, the system can include a second electrometer electrically coupled to a dynode other than the dynode electrically coupled to the electrometer. In other configurations, each of the plurality of dynodes is electrically coupled to a respective electrometer. In some embodiments, the processor is configured to determine the mean input current by calculating input currents at the dynode electrically coupled to the electrometer and at the dynode electrically coupled to the second electrometer, discarding calculated input currents below a noise current input level and above the saturation current input level, scaling each non-discarded calculated input current by its respective gain, and averaging the scaled input currents to determine a mean input current. In other embodiments, the processor is configured to determine the mean input current by calculating input currents at each dynode of the plurality of dynodes, discarding calculated input currents below a noise current input level and above the saturation current input level, scaling each non-discarded calculated input current by its respective gain, and averaging the scaled input currents to determine a mean input current.

In certain embodiments, the detectors described herein, and their methods of using them can be implemented using a computer or other device that includes a processor. The computer system typically includes at least one processor electrically coupled with one or more memory units to receive signals from the electrometers. The computer system may be, for example, a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be located on a single computer or may be distributed among a plurality of computers attached by a communications network. A general-purpose computer system may be configured, for example, to perform any of the described functions including but not limited to: dynode voltage control, measurement of current inputs (or outputs), calculation of a mean input current, image generation or the like. It should be appreciated that the system may perform other functions, including network communication, and the technology is not limited to having any particular function or set of functions.

Various aspects of the detectors and methods may be implemented as specialized software executing in a general-purpose computer system. The computer system may include a processor connected to one or more memory devices, such as a disk drive, memory, or other device for storing data. Memory is typically used for storing programs and data during operation of the computer system. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically is electrically coupled to a power source and/or the dynodes (or channels) such that electrical signals may be provided to and from the power source and/or dynodes (or channels) to provide desired signal amplification. The computer system may also include one or more input devices, for example, a keyboard, mouse, trackball, microphone, touch screen, manual switch (e.g., override switch) and one or more output devices, for example, a printing device, display screen, speaker. In addition, the computer system may contain one or more interfaces that connect the computer system to a communication network (in addition or as an alternative to the interconnection device). The computer system may also include one more single processors, e.g., digital signal processors, which can be present on a printed circuit board or may be present on a separate board or device that is electrically coupled to the printed circuit board through a suitable interface, e.g., a serial ATA interface, ISA interface, PCI interface or the like.

In certain embodiments, the storage system of the computer typically includes a computer readable and writeable nonvolatile recording medium in which signals are stored that define a program to be executed by the processor or information stored on or in the medium to be processed by the program. For example, dynode bias voltages for a particular routine, method or technique may be stored on the medium. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system.

In certain embodiments, the computer system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the computer system described above or as an independent component. Although a computer system is described by way of example as one type of computer system upon which various aspects of the technology may be practiced, it should be appreciated that aspects are not limited to being implemented on the described computer system. Various aspects may be practiced on one or more computers having a different architecture or components. The computer system may be a general-purpose computer system that is programmable using a high-level computer programming language. The computer system may be also implemented using specially programmed, special purpose hardware. In the computer system, the processor is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, Windows Vista, Windows 7 or Windows 8 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a computer platform for which application programs in high-level programming languages may be written. It should be understood that the technology is not limited to a particular computer system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate computer systems could also be used. In certain examples, the hardware or software is configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as SmallTalk, Basic, Java, C++, Ada, or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. An optical system configured to receive photons, the optical system comprising a photocathode configured to receive the photons, an anode and a plurality of dynodes, between the photocathode and the anode, in which each of the plurality of dynodes is configured to amplify an electron signal representative of the photons received by the photocathode, in which each of the plurality of dynodes is electrically coupled to a respective electrometer to provide a plurality of dynode-electrometer pairs; and
　　a first processor electrically coupled to each respective electrometer, in which the first processor is configured to measure an output signal from each dynode of the plurality of dynode-electrometer pairs and to terminate signal amplification at a saturated dynode of the plurality of dynode-electrometer pairs.

2. The optical system of claim 1, in which each electrometer is electrically isolated from other electrometers.

3. The optical system of claim 2, in which the first processor is configured to calculate a mean input current using received input current signals and using a gain of the respective dynode of the electrometer-dynode pairs.

4. The optical system of claim 2, in which the first processor is configured to calculate a gain of a first dynode by comparing a supply current of the first dynode to a supply current of a dynode immediately upstream of and adjacent to the first dynode.

5. The optical system of claim 2, in which each electrometer is electrically coupled to a signal converter to provide simultaneous digital signals to the first processor from each of the plurality of dynode-electrometer pairs.

6. The optical system of claim 5, in which the signal converter comprises an analog-to-digital converter.

7. The optical system of claim 6, further comprising a respective power converter electrically coupled to each electrometer and analog-to-digital converter pair.

8. The optical system of claim 2, in which the first processor is configured to measure all dynode currents simultaneously.

9. The optical system of claim 2, in which the first processor is configured to prevent a current overload at each dynode.

10. The optical system of claim 9, in which the first processor is configured to alter a voltage at a saturated dynode or a dynode downstream from the saturated dynode.

11. The optical system of claim 10, in which the first processor is configured to invert a polarity of the voltage of the saturated dynode or an adjacent dynode to the saturated dynode.

12. The optical system of claim 9, in which the first processor is configured to prevent any substantial secondary electron emission to a downstream dynode adjacent to the saturated dynode.

13. The optical system of claim 1, in which the optical system is configured to provide independent voltage control at each dynode of the plurality of dynodes.

14. The optical system of claim 1, in which dynamic range of current measurement is greater than $10^{10}$ when measuring at 100 kHz.

15. An optical system configured to receive an optical emission from a sample, the optical system comprising a photocathode configured to receive the optical emission, an anode and a plurality of dynodes, between the photocathode and the anode, each dynode configured to amplify an electrical signal representative of the optical emission received by the photocathode, in which every other dynode of the plurality of dynodes is electrically coupled to a respective electrometer to provide a plurality of dynode-electrometer pairs; and a first processor electrically coupled to each electrometer, in which the first processor is configured to measure an input or output signal from each dynode-electrometer pair and to terminate signal amplification at a saturated dynode of the plurality of dynode-electrometer pairs.

16. The optical system of claim 15, further comprising at least one additional electrometer electrically coupled to one of the plurality of dynodes between dynodes comprising a respective electrometer.

17. The optical system of claim 16, in which each electrometer is electrically isolated from other electrometers.

18. The optical system of claim 17, in which at least one dynode without a respective electrometer is positioned between dynodes that are electrically coupled to an electrometer.

19. The optical system of claim 15, each electrometer is electrically coupled to a signal converter to provide simultaneous digital signals to the first processor from each of the plurality of dynode-electrometer pairs.

* * * * *